(12) United States Patent
Takegawa et al.

(10) Patent No.: US 9,908,409 B2
(45) Date of Patent: Mar. 6, 2018

(54) VEHICLE ACCELERATOR PEDAL REACTION FORCE CONTROL DEVICE

(71) Applicant: MAZDA MOTOR CORPORATION, Hiroshima (JP)

(72) Inventors: Kosuke Takegawa, Hatsukaichi (JP); Nobuyuki Sakata, Hiroshima (JP); Takuru Uchiyama, Hiroshimsa (JP); Yoh Yamazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 55 days.

(21) Appl. No.: 15/024,981

(22) PCT Filed: Aug. 20, 2015

(86) PCT No.: PCT/JP2015/004184
§ 371 (c)(1),
(2) Date: Mar. 25, 2016

(87) PCT Pub. No.: WO2016/031202
PCT Pub. Date: Mar. 3, 2016

(65) Prior Publication Data
US 2016/0221437 A1    Aug. 4, 2016

(30) Foreign Application Priority Data

Aug. 29, 2014  (JP) .................................. 2014-174686
Aug. 29, 2014  (JP) .................................. 2014-174687

(51) Int. Cl.
*B60K 26/02*    (2006.01)
*G05G 1/30*    (2008.04)
*G05G 5/03*    (2008.04)

(52) U.S. Cl.
CPC ............. *B60K 26/021* (2013.01); *G05G 1/30* (2013.01); *G05G 5/03* (2013.01); *B60K 2026/023* (2013.01)

(58) Field of Classification Search
CPC ..................... B60K 26/021; B60K 2026/023
(Continued)

(56) References Cited

U.S. PATENT DOCUMENTS 5,428,531 A * 6/1995  Hayafune ............... F16H 59/66
                                                    477/107
6,604,042 B2 * 8/2003  Maruko .................... B60T 7/22
                                                    180/170

(Continued)

FOREIGN PATENT DOCUMENTS

CA         2256268 C       6/1999
JP     2004-314871 A      11/2004
(Continued)

OTHER PUBLICATIONS

Effects of alcohol intoxication on simulated driving performance; Zhuoran Wu; Changming Feng; Xinting Zhang; Guojun Chen 2011 14th International IEEE Conference on Intelligent Transportation Systems (ITSC); Year: 2011; pp. 1852-1857, DOI: 10.1109/ITSC.2011.6083124.*

(Continued)

*Primary Examiner* — Cuong H Nguyen
(74) *Attorney, Agent, or Firm* — Studebaker & Brackett PC

(57) ABSTRACT

The present invention provides a vehicle accelerator pedal reaction force control device which may increase an output by a small accelerator opening operation, allows the driving force etc. to be easily controlled by the driver's intention, increases the resistance to the depression of an accelerator to make the driver feel secure, and allows the driver to expe- (Continued)

rience the operational feeling that he or she is operating the vehicle by himself or herself.

The vehicle accelerator pedal reaction force control device 1 has a first mode in which a relation of the driving force with respect to an accelerator opening is regarded as a predetermined characteristic and a second mode in which the driving force is higher than the driving force in the first mode. In the second mode, the pedal reaction force increases with an increase in the accelerator opening with respect to the first mode.

4 Claims, 17 Drawing Sheets

(58) Field of Classification Search
USPC ............ 701/70, 93, 110, 79, 73; 180/65.21; 477/3, 7; 903/902, 930; 73/513
See application file for complete search history.

(56) References Cited

U.S. PATENT DOCUMENTS

| | | | | |
|---|---|---|---|---|
| 8,620,566 B2* | 12/2013 | Ueno | ................. | B60K 6/48 180/65.21 |
| 8,706,374 B2* | 4/2014 | Takiguchi | ............. | B60W 10/06 180/170 |
| 9,014,896 B2* | 4/2015 | Arita | .................... | B60W 20/00 701/22 |
| 9,145,130 B2* | 9/2015 | Maruyama | ............ | B60W 50/16 |
| 9,365,112 B2* | 6/2016 | Maruyama | ............... | B60K 6/48 |
| 2006/0231074 A1 | 10/2006 | Ueno et al. | | |
| 2008/0140294 A1* | 6/2008 | Park | ................... | B60K 26/021 701/93 |
| 2008/0162012 A1 | 7/2008 | Masuda et al. | | |
| 2010/0179719 A1* | 7/2010 | Kimura | ............... | B60K 26/021 701/29.1 |
| 2011/0125367 A1 | 5/2011 | Sakaguchi et al. | | |
| 2013/0066508 A1* | 3/2013 | Ueno | ...................... | B60K 6/48 701/22 |
| 2014/0012449 A1* | 1/2014 | Arita | ..................... | B60W 20/00 701/22 |
| 2014/0109717 A1 | 4/2014 | Maruyama et al. | | |
| 2014/0323265 A1* | 10/2014 | Maruyama | ........... | B60W 50/16 477/3 |
| 2015/0298546 A1* | 10/2015 | Maruyama | ............... | B60K 6/48 701/22 |
| 2016/0221437 A1* | 8/2016 | Takegawa | ............ | B60K 26/021 |

FOREIGN PATENT DOCUMENTS

| | | | | |
|---|---|---|---|---|
| JP | 2006-281798 A | | 10/2006 | |
| JP | 2007-278266 A | | 10/2007 | |
| JP | 2014-043236 A | | 3/2014 | |
| KR | 10-2006-0124906 | * | 12/2006 | ........... B60K 26/021 |
| WO | WO2011/111489 | * | 9/2011 | ............ B60W 10/06 |
| WO | WO2011/148753 | * | 12/2011 | ............... B60K 6/48 |

OTHER PUBLICATIONS

An efficient carburetor design using electronic fuel injection for small vehicles based on 110 cc self start 4 stroke engine; Muhammad Haris Mohsin et al.; 17th IEEE International Multi Topic Conference 2014; Year: 2014; pp. 473-476.*
Driving assistance through pedal reaction force control with consideration of JND; Akira Ichinose et al.; 2013 IEEE RO-MAN Year: 2013; pp. 484-489.*
Study on acceleration and deceleration maneuver guidance for driver by gas pedal reaction force control; Ryuzo Hayashi et al.; 13th International IEEE Conference on Intelligent Transportation Systems; Year: 2010; pp. 1428-1434.*
International Search Report and Written Opinion issued in Application No. PCT/JP2015/004184, dated Nov. 2, 2015.

* cited by examiner

20···ACCELERATOR PEDAL
30···ACCELERATOR PEDAL OPENING SENSOR

20···ACCELERATOR PEDAL
30···ACCELERATOR PEDAL OPENING SENSOR

VEHICLE ACCELERATOR PEDAL REACTION FORCE CONTROL DEVICE

TECHNICAL FIELD

This invention relates to a pedal reaction force control device that allows a pedal effort (a reaction force or resistance of the pedal) of an accelerator to change depending on the conditions. Specifically, the invention relates to a vehicle accelerator pedal reaction force control device which controls a reaction force to an accelerator pedal effort in an automobile including an accelerator opening detection system detecting an accelerator opening of the accelerator pedal and a vehicle running control system controlling a driving force based on the accelerator opening.

BACKGROUND ART

In general, the reaction force control (the pedal effort control) of an accelerator pedal of an automobile includes making the pedal effort heavier when the accelerator opening exceeds a fuel-efficient point, or making it heavier during cruise control where the speed of an automobile is kept constant during operation without depressing the accelerator pedal so that the accelerator pedal functions as a footrest.

In addition, the reaction force control of an accelerator pedal of an automobile may include making the depression of the accelerator pedal easy in a sport mode. Patent Document 1 describes an accelerator pedal device which performs such a reaction force control.

The accelerator pedal device of Patent Document 1 includes an electronic control damper that generates a braking force toward the direction opposite to the depression direction of a pedal arm only when the depression angle of the pedal arm increases. A characteristic curve showing a relation between a braking force and a depression angle is determined such that the rate of increase of a set braking force decreases after the depression angle exceeds θ2, i.e., in the stage where the depression of the pedal arm approaches the limit.

Further, the accelerator pedal device of Patent Document 1 is set so that, in the characteristic curve showing the relation between the braking force and the depression angle, the braking force is reduced to the lowest level in the sport mode among other operation modes.

As described above, the accelerator pedal device of Patent Document 1 sets the braking force to be low in the sport mode, and thus it is easy to accelerate the engine smoothly to a high power output, and responsivity of the engine output to the depressing operation of the accelerator pedal (the pedal arm) improves. However, in a sport mode driving where loads of acceleration/deceleration, a centrifugal force during cornering, and the bounce with hard jolting are applied easily to the driver, it is necessary for the driver to conduct gentle operation while depressing the pedal arm, or necessary for the driver to drive the automobile while worrying about the possibility of change of the accelerator opening of the vehicle body, for example.

Further, the accelerator pedal device of Patent Document 1 shows a characteristic where the increase rate of the braking force decreases with an increase in depression of the pedal arm, and thus, it may be difficult for the driver to feel the limit of the characteristic of the engine itself and the sense of unity with the automobile, i.e., the driver cannot feel that he or she is operating the automobile.

In addition, as described above, the accelerator pedal device of Patent Document 1 is set so that the braking force is reduced to the lowest level in the sport mode among the other operation modes, for example, a normal mode or an environmentally friendly mode.

In other words, the accelerator pedal device of Patent Document 1 is set so that the braking force is larger in the normal or environmentally friendly mode than in the sport mode.

However, even during a normal driving where the operation mode is the normal or environmentally friendly mode, rapid acceleration is required in some cases, for example, in passing a front vehicle. In such a situation, it is difficult to depress the pedal arm, and thus the driver may possibly feel stress.

Furthermore, Patent Document 2 suggests an accelerator pedal device controlled by using a reaction force, in particular, a viscosity reaction force, of the accelerator pedal, and an automobile including this accelerator pedal device.

According to the accelerator pedal device and the automobile including the same of Patent Document 2, a reaction force rise curve showing a relation between the pedal reaction force and the pedal position (see FIG. 11 in Patent Document 2) is used as a control target of the pedal reaction force.

In this reaction force rise curve, the pedal reaction force quadratically increases with an increase in the pedal position, and thus the pedal effort is heavy when the depression of the accelerator pedal is fast.

Rapid acceleration is required in some cases, for example, in passing a front vehicle. However, in the above-described control disclosed in Patent Document 2, in such a situation, similarly to the problem of Patent Document 1, it is difficult for the driver to depress the pedal arm, and thus he or she may possibly feel stress.

CITATION LIST

Patent Document

PATENT DOCUMENT 1: Japanese Unexamined Patent Publication No. 2014-43236
PATENT DOCUMENT 2: Japanese Unexamined Patent Publication No. 2006-281798

SUMMARY OF THE INVENTION

Technical Problem

In view of the foregoing, it is a first object of this invention to provide a vehicle accelerator pedal reaction force control device which may increase an output by a small accelerator opening operation, allows the engine performance such as the driving force to be easily controlled by the driver's intention, increases the resistance to the depression of the accelerator to make the driver feel secure, and allows the driver to experience the operational feeling that he or she is operating the vehicle by himself or herself, i.e., the sense of unity with the vehicle.

In addition, it is a second object of this invention to achieve rapid acceleration with a good response in a mode where the reaction force to the pedal effort of the accelerator pedal is increased, and prevent a driver's stress feeling.

Solution to the Problem

The vehicle accelerator pedal reaction force control device according to this invention is a vehicle accelerator pedal reaction force control device controlling a pedal reaction force in an automobile, and includes an accelerator opening detection systems detecting an accelerator opening of an accelerator pedal and a vehicle running control system controlling a driving force based on the accelerator opening. The vehicle accelerator pedal reaction force control device has a first mode in which a relation of the driving force with respect to the accelerator opening is regarded as a predetermined characteristic and a second mode in which the driving force is higher than the driving force in the first mode. In the second mode, the pedal reaction force increases with an increase in the accelerator opening with respect to the first mode.

This configuration can provide a vehicle accelerator pedal reaction force control device where an output can be increased by a small accelerator opening operation, the engine performance such as the driving force can be easily controlled by the driver's intention, the resistance to the depression of the accelerator pedal increases to make the driver feel secure, and the driver can be allowed to experience the operation feeling that he or she is operating the vehicle by himself or herself, i.e., the sense of unity with the vehicle.

Here, when controlling the driving force, the vehicle running control system controls the engine output not only directly, but also indirectly by controlling shifting, braking, etc. Specifically, the vehicle running control system includes the traction control in which idling is detected from the vehicle speed and the rotating speed of each tire, for example, and the driving force from the engine 10 is reduced and adjusted to resolve the idling of the tire.

The accelerator pedal reaction force includes at least one of a repulsion force, a frictional resistance, or a viscous resistance depending on the speed.

The accelerator opening indicates the amount of operation of the accelerator pedal or the amount of pedaling such as the pedaling angle.

In one embodiment of this invention, a release side of the accelerator opening in the second mode is set to the same reaction force as that in the first mode.

This configuration can reduce an increase in an elastical reaction of the accelerator pedal, and alleviates leg's fatigue caused when the accelerator opening is maintained or reduced.

In addition, in one embodiment of this invention, in the second mode, the driving force against the first mode increases more sharply than in the first mode when the accelerator opening is less than or equal to a predetermined value, and increases, when the accelerator opening exceeds the predetermined value, more gently than when the accelerator opening is less than or equal to a predetermined value, and the pedal reaction force also increases at an increasing rate when the accelerator opening exceeds the predetermined value.

According to the above-described configuration, in the second mode, when the accelerator opening is less than or equal to the predetermined value, the driving force can be sharply increased as compared with the increase of the driving force in the first mode. Thus, the large engine output can be controlled by a small accelerator opening operation, the engine performance such as the driving force can be easily controlled by the driver's intention, the resistance felt by the driver when he or she depresses the accelerator pedal increases, thereby making the driver feel secure.

On the other hand, if the driving force with respect to the standard mode exceeds the predetermined value, the pedal reaction force is allowed to increase gently as compared with the case where the driving force is less than or equal to the predetermined value. Thus, the characteristic can be obtained, which more significantly shows an actual tendency of the engine output that the increase rate of the engine output decreases as the driving force approaches the limit.

Then, if the accelerator opening exceeds the predetermined value, the reaction force increases at an increasing rate, and thus the driver is notified with reliability that the driving force, i.e., the engine output, approaches the limit. Thus, the characteristic of the engine output matches the resistance felt by the driver when he or she depresses the accelerator pedal, and thus, the above-described advantages are obtained more significantly. That is, the driver experiences the operational feeling that the driver himself or herself is operating the vehicle, i.e., the sense of unity with the vehicle.

In one embodiment of this invention, provided are a pedal operation variation detection system detecting an operation variation varied by operation of the accelerator pedal, and a pedal reaction force reduction system reducing an increase in the pedal reaction force if the second mode where the pedal reaction force increases with respect to the pedal reaction force in the first mode is set and the pedal operation variation detection system detects the operation variation that is more than or equal to a predetermined operation variation.

According to the above-described configuration, the vehicle accelerator pedal reaction force control device may provide the driver with the sense of security with increased resistance at the time of depressing the accelerator pedal, stability, and light and smooth operational feeling during rapid acceleration operation, i.e., the sense of unity with the vehicle.

The operation variation indicates, for example, an operation speed, an operational acceleration, or a variation (a varying rate) of the reaction force (the pedal effort) of the accelerator pedal, and may be a variation of any of a depression side operation and a release side operation of the accelerator pedal.

In addition, in one embodiment of this invention, the pedal operation variation detection system is a pedal operation speed detection system detecting an operation speed as an operation variation, and the second mode has a characteristic where a rate of increase of the pedal reaction force increases with an increase in the accelerator opening with respect to the first mode, and if the operation speed is a predetermined value or higher, an increase in the rate of increase of the pedal reaction force with respect to an accelerator opening increase amount is reduced.

According to the above configuration, the reaction force of the accelerator pedal is prevented from increasing at an increasing rate, and the accelerator pedal can be deeply depressed without causing stress on the driver.

In addition, in one embodiment of this invention, the second mode is a high-power mode where the driving force with respect to the accelerator opening is set to be higher than the driving force in the first mode, and in the second mode, the pedal reaction force reduction system reduces an increase in the pedal reaction force with an increase in the accelerator opening in a range where the pedal reaction force is larger than the pedal reaction force in the first mode.

According to the above configuration, a high output feeling, which is a heavier pedal effort than that in the first mode such as a basic mode, can be felt at the time of additional depression of the accelerator pedal, whereas a light pedal operation can be done with an appropriate reaction force.

Advantages of the Invention

According to this invention, an output may be increased by a small accelerator opening operation, the engine performance such as the driving force may be easily controlled by the driver's intention, the resistance to the depression of the accelerator increases to make the driver feel secure, and the driver is allowed to experience the operational feeling that he or she is operating the vehicle by himself or herself, i.e., the sense of unity with the vehicle.

In addition, in one embodiment of this invention, rapid acceleration with a good response is achievable in the second mode where the reaction force to the pedal effort of the accelerator pedal is larger than that in the first mode, and the driver's stress feeling is reducible.

DESCRIPTION OF EMBODIMENTS

Embodiments of this invention will be described in detail with reference to the drawings. The following descriptions are merely examples.

First, a first embodiment will be described.

First Embodiment

Figure 1:
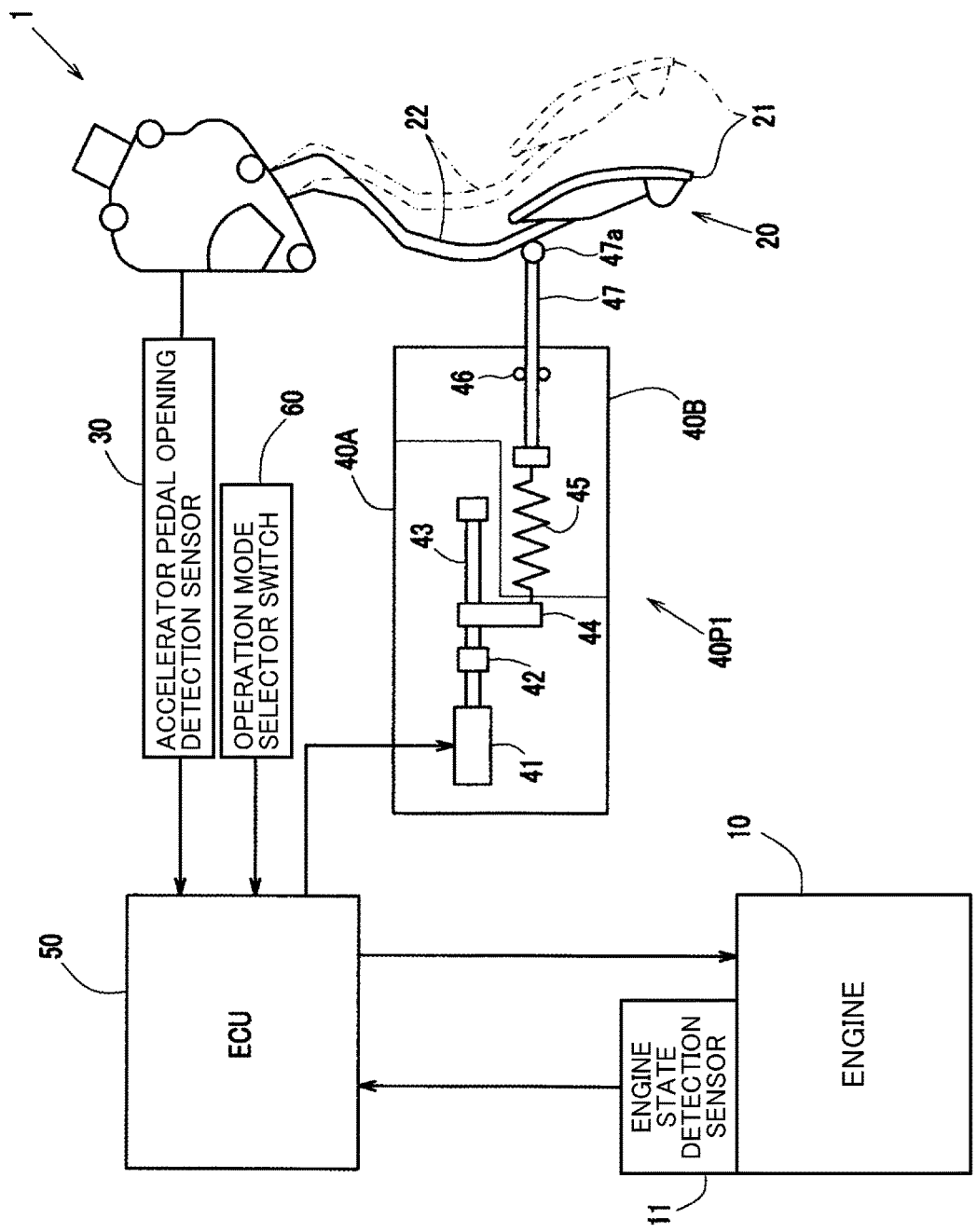
FIG. 1 is a block diagram showing a general configuration of a vehicle accelerator pedal reaction force control device of a first embodiment.

As illustrated in FIG. 1, a vehicle accelerator pedal reaction force control device 1 of the first embodiment includes an engine 10, an accelerator pedal 20, an accelerator pedal opening detection sensor 30 detecting a rotation angle of the accelerator pedal 20, a reaction force application unit 40P1 applying reaction force (hereinafter referred to as "pedal reaction force") to the accelerator pedal 20, an ECU 50 controlling the engine 10 and the reaction force application unit 40P1 based on the rotation angle detected by the accelerator pedal opening detection sensor 30, and an operation mode selector switch 60 switching the operation mode.

The engine 10 is a device that drives a vehicle using fuel such as gasoline. Ignition timing and a throttle valve opening of the engine 10 are controlled depending on an engine output signal from the ECU 50 based on an engine state detection signal detected by the engine state detection sensor 11 or a later-described pedal opening detection signal detected by the accelerator pedal opening detection sensor 30. Accordingly, for example, the depression amount of the accelerator pedal 20 and the injection amount (the engine output) of the engine 10 are associated together based on the engine characteristic.

Note that the engine state detection sensor 11 detects, for example, the driving force or the number of revolutions of the engine 10 as an engine state.

The accelerator pedal 20 includes a pedal plate 21 receiving a pedal effort from a driver and a pedal arm 22 supporting the pedal plate 21. The pedal arm 22 includes a base end portion pivotally supported by a shaft, and is biased to an initial position through a pressing pin 47 by a biasing force of a later-described return spring 45.

The accelerator pedal opening detection sensor 30 may be configured as, for example, a potentiometer detecting an accelerator pedal opening (a pedaling angle) (hereinafter referred to as an "accelerator opening") based on resistance occurring during a rotation (during a swing), or an encoder detecting the accelerator opening based on a pulse. The detected pedal opening detection signal is transmitted to the ECU 50. The accelerator pedal opening detection sensor 30 may be configured to detect not only the rotation angle of the accelerator pedal 20 but also a position or a displacement of the pedal arm 22.

The reaction force application unit 40P1 is roughly divided into a reaction force characteristic change portion 40A and a plunger portion 40B. The reaction force characteristic change portion 40A includes a motor 41 as an actuator that drives to switch the reaction force characteristic of the accelerator pedal 20 depending on the signal from the ECU 50, a speed reducer 42 that amplifies the driving force of the motor 41, a screw shaft 43 that rotates about the shaft with the driving force amplified by the speed reducer 42, and a slider 44 that slides along the screw shaft 43 and can compress a later-described return spring 45 from one of its ends.

The plunger portion 40B has a plunger mechanism including a return spring 45 that biases the accelerator pedal 20, and a straight pressing pin 47 that is supported by the supporting roller 46 and slides to make a stroke in which a pressing ball 47a provided on a tip end portion thereof protrudes to press, or retreats from, the accelerator pedal 20 depending on the biasing force of the return spring 45.

In addition, the ECU 50 is a controller including a microcomputer that executes processings of changing the reaction force characteristic (a pedal effort characteristic) of the accelerator pedal 20 or the engine output characteristic based on a detection signal detected by the accelerator pedal opening detection sensor 30 and involving the rotation angle of the accelerator pedal 20 and the engine state detection signal detected by the engine state detection sensor 11. The ECU 50 includes a memory which stores various kinds of data, such as a large-capacity memory, a nonvolatile memory (ROM), or a volatile memory (RAM).

The operation mode selector switch 60 selects an appropriate operation mode from, for example, a low-power mode (an ecological mode), a standard mode, and a high-power mode (a sport mode) by pressing the switch, for example. A selected operation mode signal is transmitted to the ECU 50, and the ECU 50 outputs an engine output signal corresponding to a switching signal for executing the selected operation mode to the reaction force application unit 40P1 and the engine 10. The operation mode selector switch 60 is not limited to a mechanical switch, but may be, for example, a touch-type switch integrated with a monitor.

Next, the reaction force characteristic of the pedal reaction force (the pedal effort) of the accelerator pedal 20 of the vehicle accelerator pedal reaction force control device 1 of the first embodiment will be described with reference to an upper graph of FIG. 2, upper and lower graphs of FIG. 3, and upper and lower graphs of FIG. 4, and also, the engine output characteristic of the engine output of the engine 10 will be described with reference to a lower graph of FIG. 2.

Note that, in the following descriptions, the reaction force characteristic and the engine output characteristic appearing when the operation mode is the low-power mode are omitted, and only those appearing when the operation mode is the high-power mode and the standard mode will be described.

Figure 2:
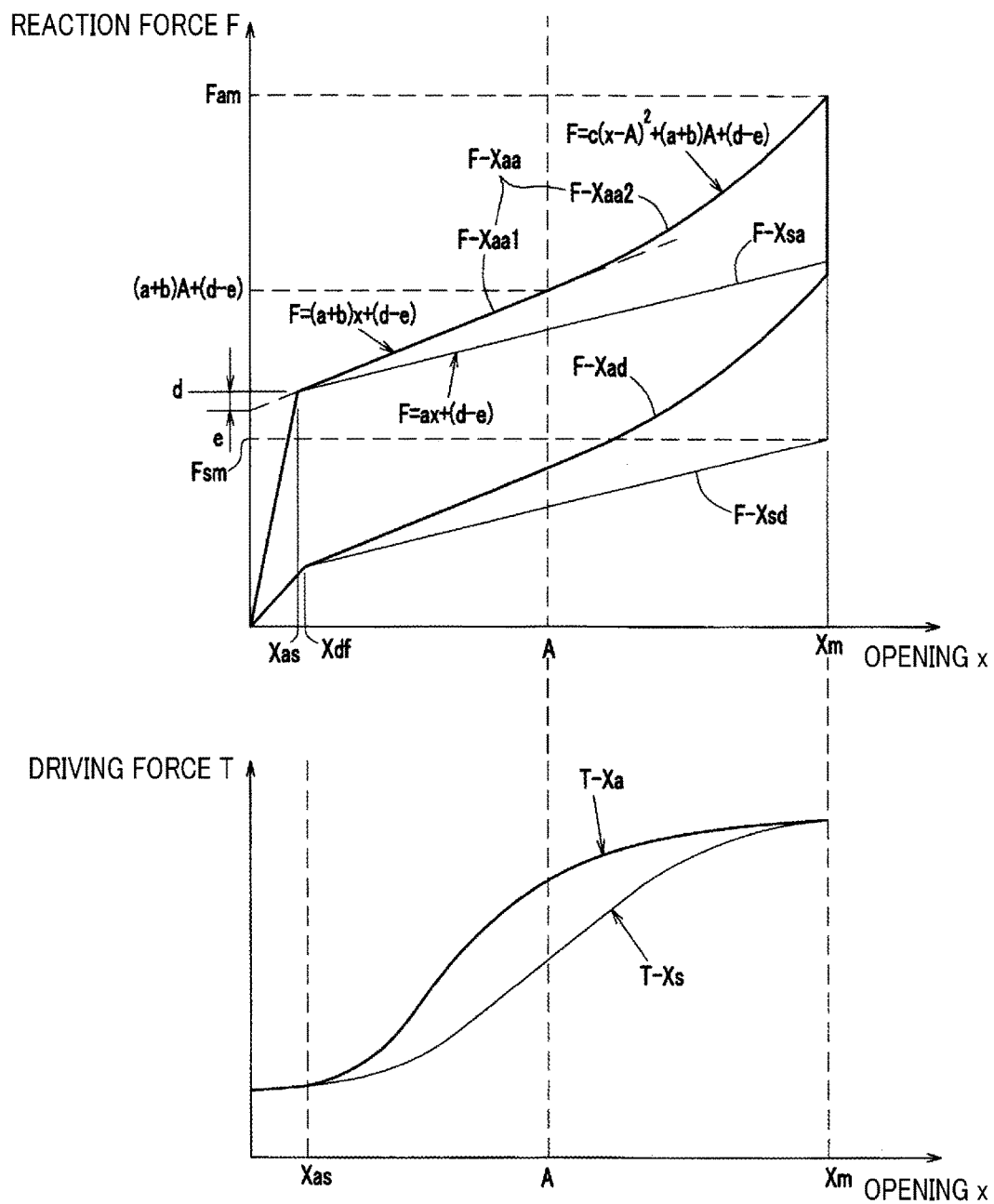
FIG. 2 shows graphs showing an accelerator pedal reaction force characteristic and an output characteristic of an engine.

The upper graph of FIG. 2 shows a relation between the pedal reaction force and the accelerator opening as a reaction force characteristic of the accelerator pedal 20 where the vehicle accelerator pedal reaction force control device 1 is operated in the standard mode and the high-power mode.

A waveform F-Xaa shown by a solid line in the upper graph of FIG. 2 represents the depression reaction force characteristic in the high-power mode, and a waveform F-Xsa shown by a thin line represents the depression reaction force characteristic in the standard mode. Further, a waveform F-Xad shown by a solid line in the upper graph of FIG. 2 represents the release reaction force characteristic in the high-power mode, and a waveform F-Xsd shown in a thin line represents the release reaction force characteristic in the standard mode.

The lower graph of FIG. 2 shows a relation between the driving force and the accelerator opening as an output characteristic of the engine 10 (hereinafter referred to as an "engine output characteristic") where the vehicle accelerator pedal reaction force control device 1 is operated in the standard mode and the high-power mode.

A waveform T-Xa shown by a solid line in the lower graph of FIG. 2 represents the engine output characteristic in the high-power mode, and a waveform T-Xs shown by a thin line represents the engine characteristic in the standard mode.

Figure 3:
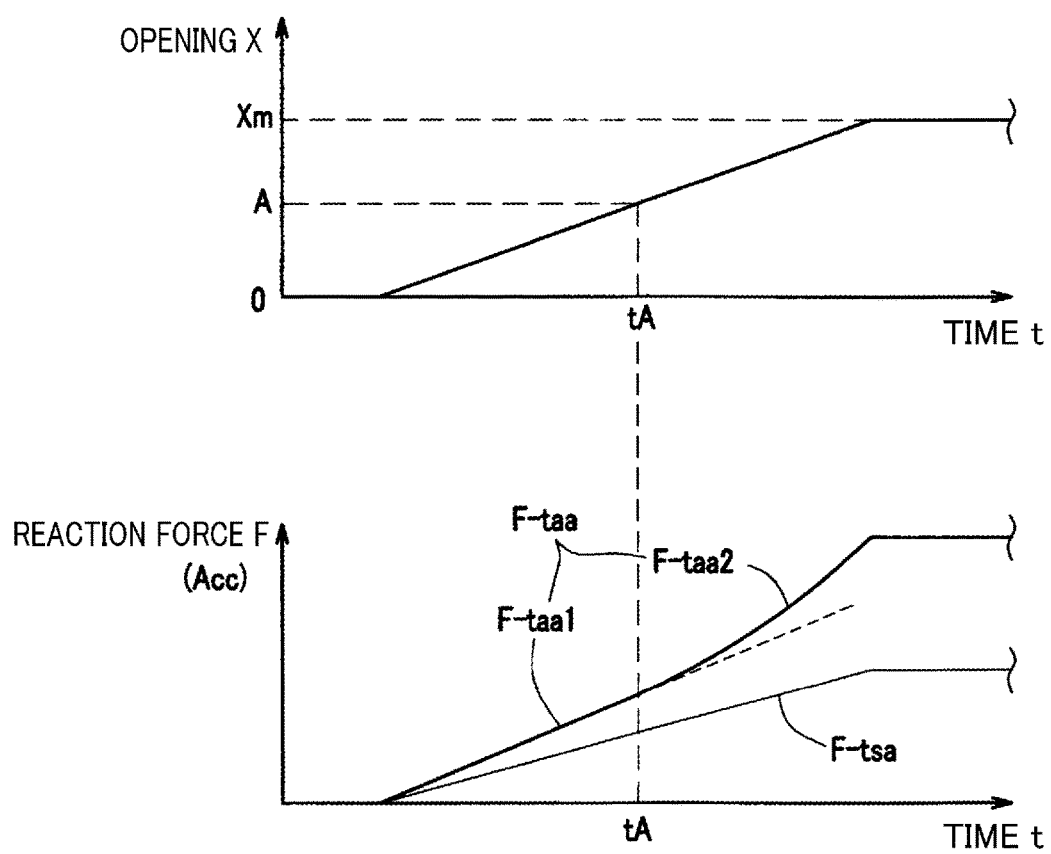
FIG. 3 shows timing charts of an opening and a reaction force of an accelerator pedal depression.

The upper graph of FIG. 3 is a timing chart of the accelerator opening in a depressing pattern (hereinafter referred to as a "first depressing pattern") where the accelerator pedal is depressed at a constant depressing speed from the accelerator opening 0 to the maximum accelerator opening Xm. The lower graph of FIG. 3 is a timing chart of the pedal reaction force where the accelerator pedal 20 is depressed in a state in which the accelerator opening varies in the first depressing pattern of the upper graph of FIG. 3. The upper graph of FIG. 4 is a timing chart of the accelerator opening in a releasing pattern (hereinafter referred to as a "first releasing pattern") where the accelerator pedal depressed to the maximum accelerator opening Xm is released at a constant releasing speed to the accelerator opening 0. The lower graph of FIG. 4 is a timing chart of the pedal reaction force where the accelerator pedal 20 is released in the first releasing pattern shown in the upper graph of FIG. 4. Just like the waveforms F-taa and F-tsa in the lower graph of FIG. 3, a waveform F-tad and a waveform F-tsd in the lower graph of FIG. 4 represent the reaction force characteristic appearing when the accelerator pedal 20 is released from a depressed state.

First, the accelerator pedal reaction force characteristic and the engine output characteristic in the standard mode of the vehicle accelerator pedal reaction force control device 1 of the first embodiment will be described.

As shown in the upper graph of FIG. 2 and the upper and lower graphs of FIG. 3, the standard mode depression reaction force characteristic is set so that the pedal reaction force sharply increases up to a depression play opening Xas with an increase in the accelerator opening, and when the accelerator opening is larger than the depression play opening Xas, the pedal reaction force increases at a constant increase rate relative to the increase in the accelerator opening and thus has a linear relationship with the accelerator opening, the constant increase rate being lower than the increase rate of the pedal reaction force when the accelerator opening is lower than the depression play opening Xas (see the waveform F-Xsa in the upper graph of FIG. 2 and the waveform F-tsa in the lower graph of FIG. 3).

That is, this accelerator opening is set so that, as shown in the upper graph of FIG. 2, the relation (a reaction force/opening characteristic expression) between a pedal reaction force F and an accelerator opening x from the depression play opening Xas to the maximum accelerator opening Xm is expressed by F=ax+(d−e).

Here, the parameter a is a predetermined constant, and the parameter (d−e) is a pedal reaction force where the accelerator opening is 0 in a state in which the depression play opening Xas is not considered in the reaction force/opening characteristic expression. The parameter d is a pedal reaction force at the depression play opening Xas.

Figure 4:
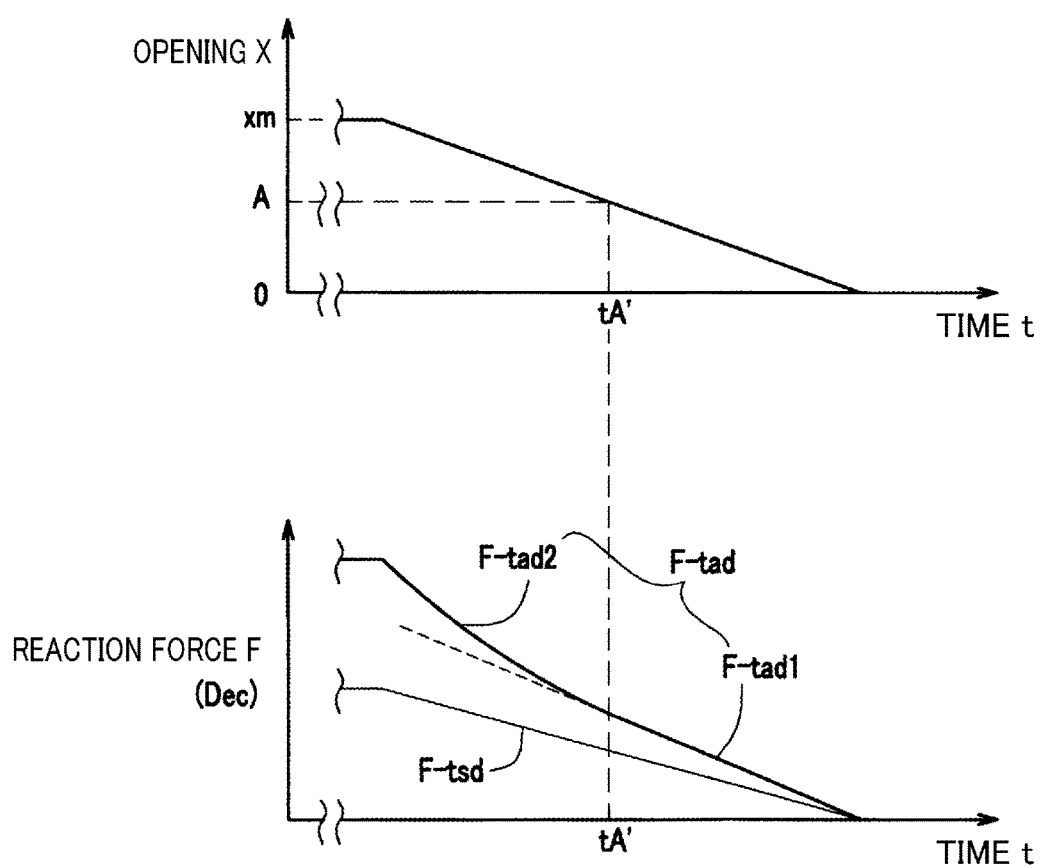
FIG. 4 shows timing charts of an opening and a reaction force of an accelerator pedal release.

On the other hand, as shown in the upper graph of FIG. 2 and the upper and lower graphs of FIG. 4, the standard mode release reaction force characteristic is set to follow almost the same inclination as that of the standard mode depression reaction force characteristic in a position lower by the hysteresis of the same accelerator opening than that of the standard mode depression reaction force characteristic (the waveform F-Xsa) in a range from the maximum accelerator opening Xm to the release play opening Xdf which is slightly larger than the depression play opening Xas (see the waveform F-Xsd in the upper graph of FIG. 2 and the waveform F-tsd in the lower graph of FIG. 4).

The standard mode release reaction force characteristic is set so that if the accelerator opening is smaller than the release play opening Xdf, the pedal reaction force sharply decreases with a decrease in the accelerator opening. The maximum reaction force Fsm occurring in a release is set based on the pedal reaction force that a driver feels critical when the accelerator opening is kept constant.

Further, the engine output characteristic of the standard mode has a characteristic in which, as shown by the waveform T-Xs in the lower graph of FIG. 2, if the accelerator opening is larger than the depression play opening Xas, the driving force (the engine output) slowly increases with an increase in the accelerator opening, then generally linearly increases, and converges to a critical driving force as the increase rate slowly declines as the accelerator opening approaches to the critical opening.

On the other hand, the depression reaction force characteristic (the high-power mode depression reaction force characteristic of the first embodiment) appearing when the operation mode of the vehicle accelerator pedal reaction force control device 1 is the high-power mode will be described. Note that the description of the same characteristic as that of the standard mode depression reaction force characteristic (the waveform F-Xsa) will be omitted except the cases particularly specified.

As shown in the upper graph of FIG. 2 and the upper and lower graphs of FIG. 3, the high-power mode depression reaction force characteristic (hereinafter referred to as a "high-power mode depression reaction force characteristic of the first embodiment") includes a first depression reaction force characteristic (a waveform F-Xaa1) appearing when the accelerator opening is lower than an opening threshold A, and a second depression reaction force characteristic (a waveform F-Xaa2) showing that, when the accelerator opening is more than or equal to the opening threshold A, the driving force increases to be higher than that when the first depression reaction force characteristic appears (see a waveform F-taa1 and a waveform F-taa2 in the lower graph of FIG. 3).

The first depression reaction force characteristic is set so that in a range where the accelerator opening is larger than the depression play opening Xas and is smaller than the opening threshold A, the pedal reaction force increases at a constant increase rate higher than the increase rate of the pedal reaction force with respect to the accelerator opening in the standard mode depression reaction force characteristic (the waveform F-Xsa) (see the waveform F-Xaa1 in the upper graph of FIG. 2 and the waveform F-taa1 in the lower graph of FIG. 3).

In other words, as shown in the upper graph of FIG. 2, in a range of the accelerator opening from the depression play opening Xas to the predetermined opening threshold A, this first depression reaction force characteristic (the waveform F-Xaa1) is set to have a linear relationship represented by a waveform of a first depression reaction force characteristic expression, i.e., $F=(a+b)x+(d-e)$, which is steeper than the standard mode depression reaction force characteristic (the waveform F-Xsa). Note that the parameter b is a predetermined constant.

In a range where the accelerator opening is more than or equal to the predetermined opening threshold A and is below the maximum accelerator opening Xm, the second depression reaction force characteristic is set so that the increase rate of the pedal reaction force gradually increases with an increase in the accelerator opening (see the waveform F-Xaa2 in the upper graph of FIG. 2 and the waveform F-taa2 in the lower graph of FIG. 3).

In other words, as shown in the upper graph of FIG. 2 and the upper and lower graphs of FIG. 3, in a range where the accelerator opening is more than or equal to the predetermined opening threshold A and below the maximum accelerator opening Xm, this second depression reaction force characteristic (the waveform F-Xaa2) has a waveform of a second depression reaction force characteristic expression, i.e., $F=c(x-A)^2+(a+b)A+(d-e)$, and also is set so that the increase rate of the pedal reaction force increases depending on the accelerator opening, i.e., the pedal reaction force increases quadratically or at an increasing rate depending on the accelerator opening.

Note that the parameter c is a predetermined constant. The depression maximum pedal reaction force Fam at the maximum accelerator opening Xm is set based on the pedal reaction force that a driver feels critical when the accelerator pedal 20 is depressed to the maximum accelerator opening Xm.

Accordingly, because the high-power mode depression reaction force characteristic is set so that the characteristic of the engine output appears on the pedal effort depending on the accelerator opening, an appropriate pedal reaction force determined based on this characteristic can be delivered to the driver. Thus, the driver can precisely sense through an accelerator pedal operation whether the engine output state is approaching the critical or still has an allowance.

Further, the engine characteristic in the high-power mode has a characteristic such that as shown by the waveform T-Xa in the lower graph of FIG. 2, if the accelerator opening is larger than the depression play opening Xas, the driving force (the engine output) of the engine 10 increases and rises with an increase in the accelerator opening at an increase rate larger than that in the standard mode, and if the accelerator opening exceeds the opening threshold A, the driving force slowly increases with a decrease in the increase rate and converges to the critical driving force.

On the other hand, the high-power mode release reaction force characteristic (hereinafter referred to as a "high-power mode release reaction force characteristic of the first embodiment") shown in the upper graph of FIG. 2 and the lower graph of FIG. 4 has a characteristic so that, if a release is done as shown by the first releasing pattern shown in the upper graph of FIG. 4 so that the waveform is symmetric to the first depressing pattern with respect to the opening axis so that the waveform of the first depressing pattern is traced from the maximum accelerator opening Xm to the release play opening Xdf, the waveform that is lower than but has the same tendency as the reaction force of the high-power mode depression reaction force characteristic of the first embodiment is traced from the maximum accelerator opening Xm to the smaller opening as shown in the upper graph of FIG. 2 (see waveform F-Xsd in the upper graph of FIG. 2).

In other words, as shown in the lower graph of FIG. 4, the high-power mode release reaction force characteristic of the first embodiment has a waveform that is symmetric to the waveform of the high-power mode depression reaction force characteristic of the first embodiment with respect to the reaction force axis (see the waveform F-tsd in the lower graph of FIG. 4).

Note that the high-power mode release reaction force characteristic of the first embodiment is not limited to the above-described characteristic, and may have the same inclination as the standard mode release reaction force characteristic (see the waveform F-Xsd in the upper graph of FIG. 2 and the waveform F-tsd in the lower graph of FIG. 4).

Next, an embodiment of the depression reaction force control of the accelerator pedal 20 in each of the standard mode and the high-power mode will be described by using a flowchart shown in FIG. 5, as one embodiment of the vehicle accelerator pedal reaction force control device 1 having the above-described reaction force characteristic and the engine characteristic.

The reaction force control of the accelerator pedal 20 of this embodiment is done based on the reaction force/opening principle characteristic expression represented by the following expression showing the relation between the pedal reaction force and the accelerator opening.

$$F=c(x-A)^2+(a+b)x+(d-e) \quad \text{(Expression 1)}$$

Here, the term $c(x-A)^2$ in the reaction force/opening principle characteristic expression shows the second depression reaction force characteristic applied when the accelerator opening is the predetermined opening threshold A or more in the high-power mode, the term $(a+b)x$ shows the first depression reaction force characteristic applied when the accelerator opening is less than the predetermined opening threshold A in the high-power mode.

In this embodiment, the standard mode is set as an initial operation mode. In the standard mode, the parameters in the reaction force/opening principle characteristic expression are initially set to a=1, b=0, c=0, and d−e=8, and thus the reaction force/opening characteristic expression in the standard mode is represented by the expression F=x+8.

That is, based on a command of the ECU 50, the reaction force application unit 40P1 makes the slider 44 slide by the driving force of the motor 41, and makes the pressing pin 47 press the accelerator pedal 20 while changing the biasing force of the return spring 45 so that the reaction force/opening characteristic expression holds.

In this time, the engine output characteristic has a linear driving force/opening characteristic with a gentle inclination as indicated by the waveform T-Xs in the above-described lower graph of FIG. 2 (S111).

If the vehicle keeps running in the standard mode (if the answer is No in S112) is changed from the standard mode to, e.g., the high-power mode by operating, e.g., pressing, the operation mode selector switch 60 (if the answer is Yes in S113), the ECU 50 determines whether or not the accelerator opening x is more than or equal to the predetermined opening threshold A based on a pedal angle signal detected by the accelerator pedal opening detection sensor 30 (S114).

If the accelerator opening x is smaller than the predetermined opening threshold A (if the answer is No in S114), the ECU 50 substitutes 0.5 for the parameter b which is initially set to 0 in the reaction force/opening principle characteristic expression (S115).

Accordingly, the term $(a+b)x$ in the reaction force/opening principle characteristic expression is 1.5x, and thus the reaction force/opening characteristic expression F=1.5x+8 holds if the accelerator opening x in the high-power mode is smaller than the predetermined opening threshold A (see the upper graph of FIG. 2).

That is, based on a command of the ECU 50, the reaction force application unit 40P1 makes the slider 44 slide by the driving force of the motor 41, and makes the pressing pin 47 press the accelerator pedal 20 while changing the biasing force of the return spring 45 so that the reaction force/opening characteristic expression holds.

Subsequently, in the determining process of Step S116, the above-described high-power mode continues (Option 2 is selected in S116) until the operation mode is switched to the standard mode (Option 1 is selected in S116) or the running is stopped (Option 3 is selected in S116) by, e.g., completely releasing the accelerator pedal 20.

On the other hand, if the accelerator opening x is more than or equal to predetermined opening threshold A in the high-power mode (if the answer is Yes in S114), the ECU 50 substitutes 0.5 for the parameter b which is initially set to be 0 in the reaction force/opening principle characteristic expression, substitutes 1.0 for the parameter c which is initially set to be 0, and substitutes 1.5 A for the term $(a+b)x$, namely, 1.5x, in the reaction force/opening principle characteristic expression (S117). Accordingly, the reaction force/opening characteristic expression $F=(x-A)^2+1.5 A+8$ holds if the accelerator opening x in the high-power mode is more than or equal to the predetermined opening threshold A (see the upper graph of FIG. 2).

That is, based on a command of the ECU 50, the reaction force application unit 40P1 makes the slider 44 slide by the driving force of the motor 41, and makes the pressing pin 47 press the accelerator pedal 20 while changing the biasing force of the return spring 45 so that the reaction force/opening characteristic expression holds.

Until the accelerator opening x becomes smaller than the predetermined opening threshold A (if the answer is Yes in S118), the ECU 50 continues the reaction force control of the accelerator pedal 20 based on the reaction force characteristic shown in the FIG. 2 and the upper and lower graphs of FIG. 3 (if the answer is No in S118).

Figure 5:
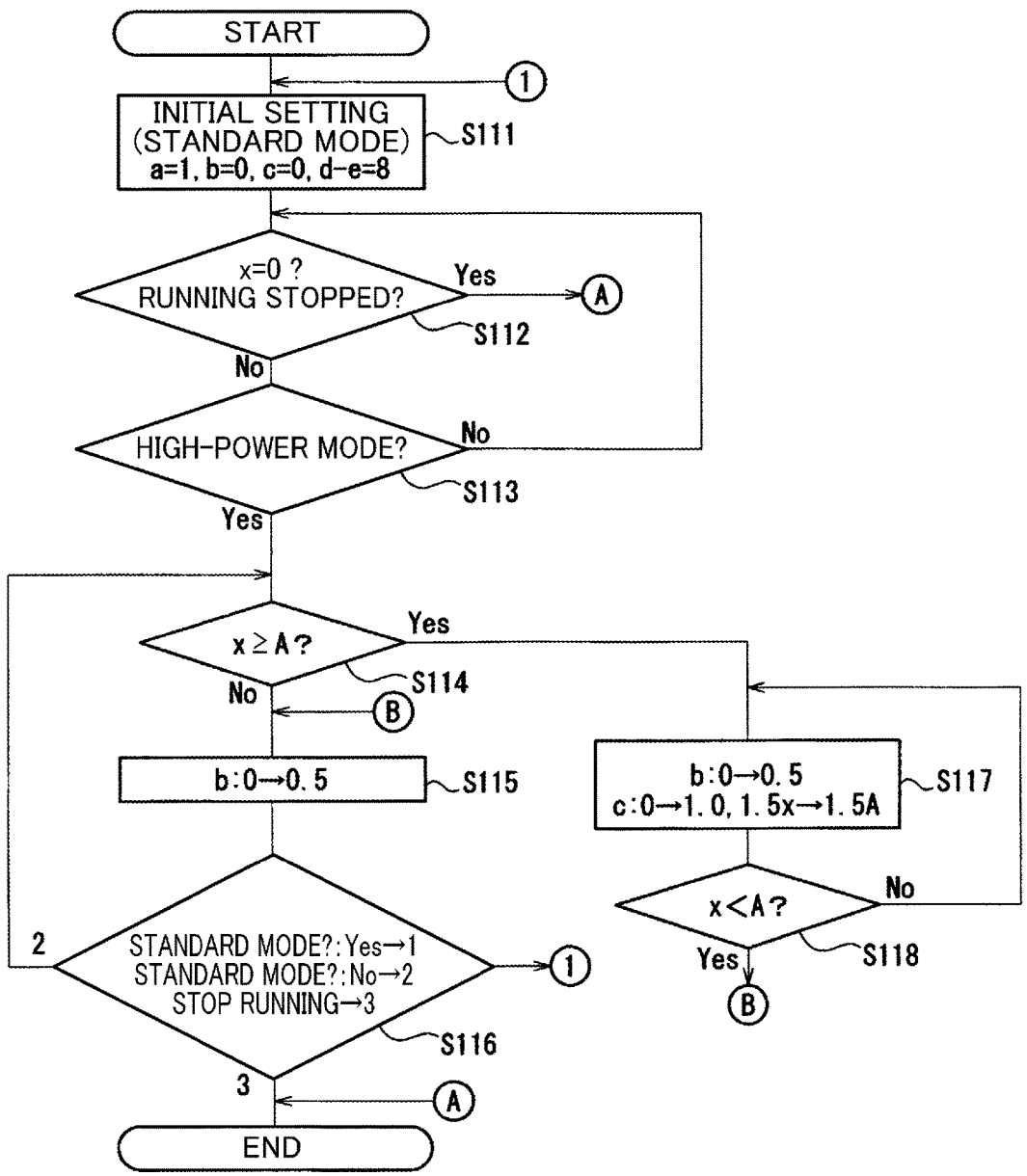
FIG. 5 is a flowchart showing one example of vehicle accelerator pedal reaction force control.

Note that, if the accelerator opening x is less than or equal to the predetermined opening threshold A (if the answer is Yes in S118), the ECU 50 executes Step S116 and the subsequent processing as shown in FIG. 5.

As one embodiment of the reaction force control of the above-described accelerator pedal 20, the embodiment of the depression reaction force control of the accelerator pedal 20 has been mainly described. However, just like the embodiment of the depression reaction force control of the accelerator pedal 20 described with reference to the flowchart shown in the FIG. 5, the release reaction force control of the accelerator pedal 20 is done based on the waveforms F-tad and F-tsd in the lower graph of FIG. 4 when the accelerator pedal 20 is released.

Next, the reaction force characteristic of the vehicle accelerator pedal reaction force control device 1 of the first embodiment will be described based on a second depressing pattern differing from the first depressing pattern (the upper graph of FIG. 3) and shown in an upper graph of FIG. 6.

Figure 6:
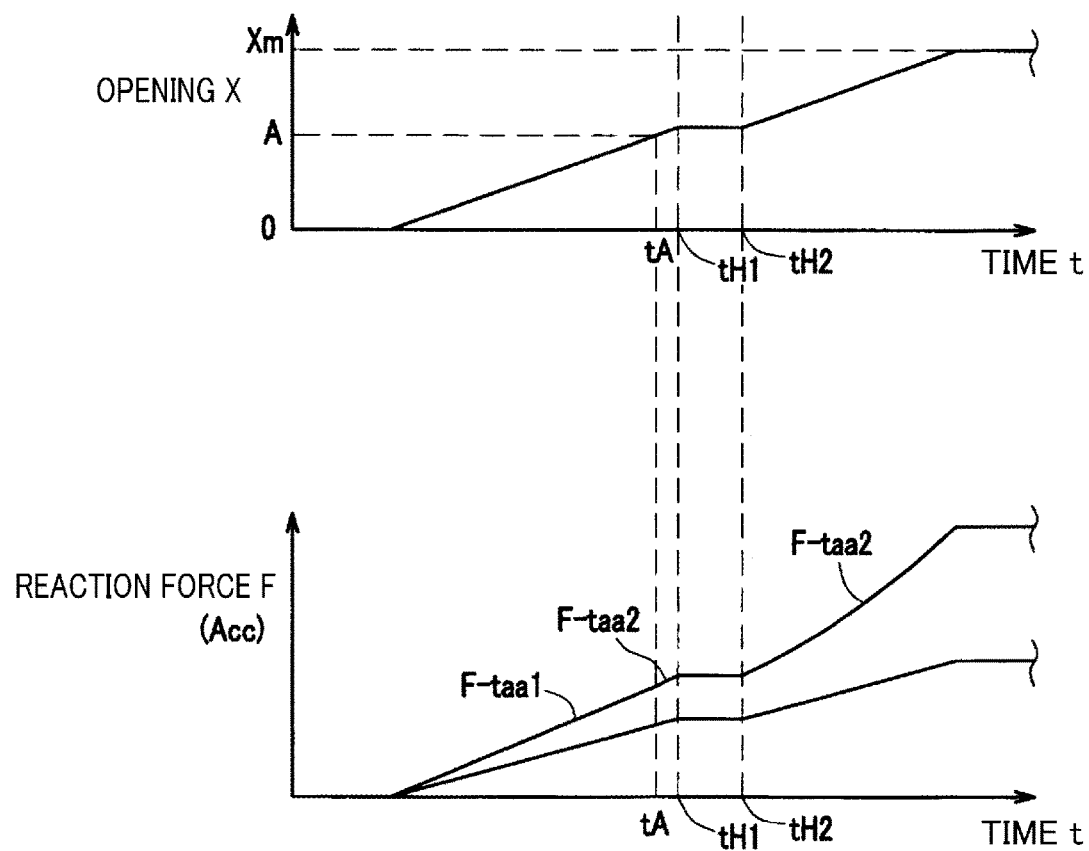
FIG. 6 shows timing charts of an opening and a reaction force of an accelerator pedal depression in another depressing pattern.

The upper graph of FIG. 6 is a timing chart of the second depressing pattern where the accelerator pedal 20 is depressed from the accelerator opening 0 at a constant speed, kept at a predetermined opening when the accelerator opening x exceeds the predetermined opening threshold A, and then depressed again to the maximum accelerator opening Xm at a constant pedal depression speed.

Assume that the parameters in the reaction force/opening principle characteristic expression $(F=c(x-A)^2+(a+b)x+(d-e))$ are set to the same values as the respective parameters set in the reaction force control processing of the accelerator pedal 20 described by using the flowchart of FIG. 5.

The pedal reaction force characteristic has the same depressing pattern as the first depressing pattern (see the upper graph of FIG. 3) until the start (tH1) of keeping the opening of the accelerator pedal 20 constant as shown in the upper graph of FIG. 6, and thus is similar to that shown in the lower graph of FIG. 3 as shown in the lower graph of FIG. 6 (see the waveforms F-Xaa1 and F-Xaa2 in the upper graph of FIG. 2 and the waveforms F-taa1 and F-taa2 in the lower graph of FIG. 3).

Subsequently, the pedal reaction force is kept constant while the accelerator opening is held at a predetermined opening. However, assuming that the accelerator pedal 20 is not held from time tH1 to time tH2, the reaction force/opening characteristic appearing after the start of depressing the accelerator pedal 20 at a predetermined time (tH2) is considered to be the reaction force characteristic not from time tH1 but from time tH2. In other words, it is represented by the pedal reaction force characteristic expression F=(x−

A)$^2$+1.5 A+8, which shows a relation appearing immediately before the accelerator opening is held at the predetermined opening.

The pedal reaction force of the accelerator pedal 20 that is released after being held for a predetermined time by, e.g., a predetermined opening smaller than the opening threshold A is represented by the reaction force characteristic F=1.5x+8 where the accelerator pedal 20 is not held.

Figure 7:
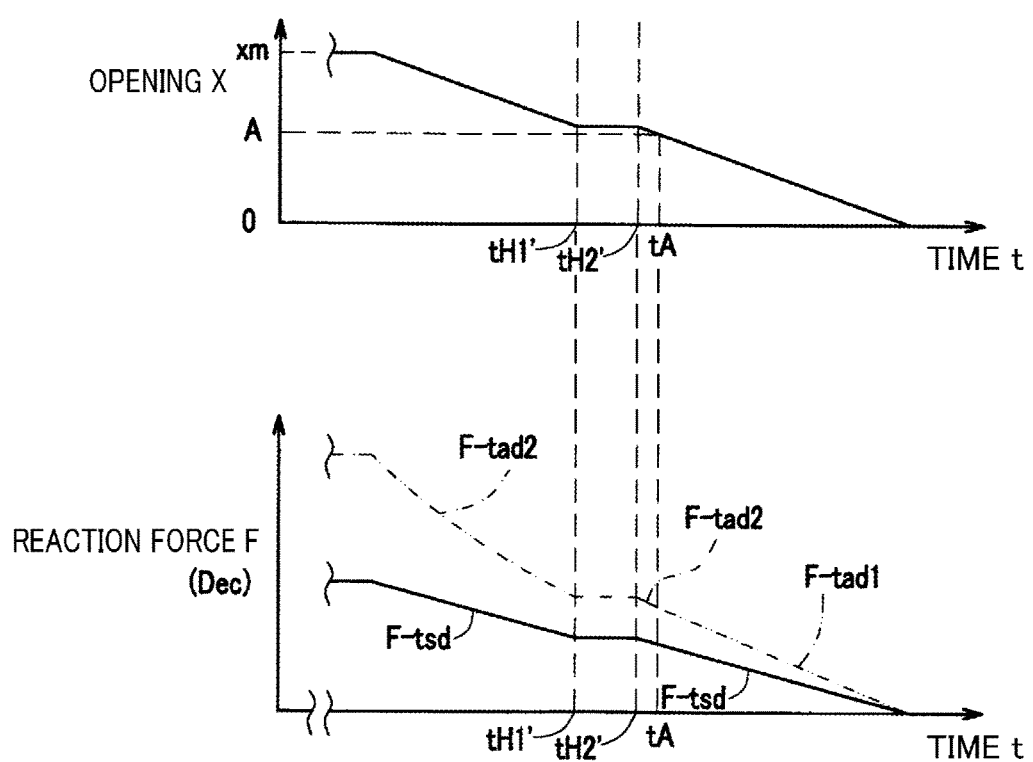
FIG. 7 shows timing charts of an opening and a reaction force of an accelerator pedal release in another releasing pattern.

On the other hand, based on the releasing pattern of accelerator pedal 20 shown in an upper graph of FIG. 7 where the accelerator pedal 20 is kept for a predetermined time at, for example, a predetermined accelerator opening beyond the opening threshold A during when the accelerator pedal 20 depressed to the maximum accelerator opening Xm is released at a constant releasing speed to the completely undepressed state, the release pedal reaction force characteristic is similar to that in the standard mode shown in the upper graph of FIG. 2 and the lower graph of FIG. 4 (see the waveform F-Xsd in the upper graph of FIG. 2 and the waveform F-tsd in the lower graph of FIG. 4), and as shown in a lower graph of FIG. 7, similarly to the depression pedal reaction force characteristic, the pedal reaction force at the time (tH2') of the stop of keeping the accelerator pedal 20 has a reaction force characteristic that would appear if the start of keeping the accelerator pedal 20 was not done at the time (tH1') of the start of keeping the accelerator pedal 20.

In this manner, the vehicle accelerator pedal reaction force control device 1 of the first embodiment is configured as a vehicle accelerator pedal reaction force control device that controls the pedal reaction force in an automobile, and includes the accelerator pedal opening detection sensor 30 as an accelerator opening detection system detecting the accelerator opening of the accelerator pedal 20 and the ECU 50 as a vehicle running control system controlling the driving force based on the accelerator opening. The relation of the driving force with respect to the accelerator opening (the engine output characteristic) is set so that, in the high-power mode, the pedal reaction force more increases with an increases in the accelerator opening than in the standard mode where the standard mode is a first mode that has a predetermined characteristic and the high-power mode is a second mode where the driving force more increases than in the standard mode.

According to the above-described configuration, the output may be increased by a small accelerator opening operation, the engine performance such as the driving force may be easily controlled by the driver's intention, the resistance felt by the driver increases when the accelerator pedal 20 is depressed to make the driver feel secure, and the driver is allowed to experience the operational feeling that he or she is operating the vehicle by himself or herself, i.e., the sense of unity with the vehicle.

In addition, in one embodiment of this invention, the release side of the accelerator opening in the high-power mode is set to the same pedal reaction force as that in the standard mode.

This configuration may reduce an increase in an elastical reaction of the accelerator pedal 20, and alleviates leg's fatigue caused when the accelerator opening is maintained or reduced.

Also, in one embodiment of this invention, in the high-power mode, the driving force against the standard mode increases at a higher rate than in the standard mode when the accelerator opening is less than or equal to the predetermined value, and increases at a lower rate than the rate adopted when the accelerator opening is less than or equal to a predetermined value. The pedal reaction force increases at an increasing rate when the accelerator opening exceeds the predetermined value.

According to the above-described configuration, in the high-power mode, when the accelerator opening is less than or equal to the predetermined value where there is an allowance for the engine output, the accelerator opening and the pedal reaction force have a linear relationship, and the driving force can be sharply increased as compared with the increase of the driving force in the standard mode. Thus, the large engine output (the driving force) may be controlled by a small accelerator opening operation, the engine 10 performance such as the driving force may be easily controlled by the driver's intention, the resistance felt by the driver when he or she depresses the accelerator pedal 20 increases, thereby making the driver feel secure.

On the other hand, if the driving force with respect to the standard mode exceeds the predetermined value, the pedal reaction force is allowed to increase gently as compared with the case where the driving force is less than or equal to the predetermined value. Thus, the characteristic can be obtained, which more significantly shows an actual tendency of the engine output that the increase rate of the engine output decreases as the driving force approaches the limit.

Then, if the accelerator opening exceeds the predetermined value, the pedal reaction force increases at an increasing rate (quadratically) with an increase in the accelerator opening, and thus the driver is notified with reliability that the driving force, i.e., the engine output, approaches the limit. Thus, the characteristic of the engine output matches the resistance felt by the driver when he or she depresses the accelerator pedal 20, and thus, the above-described advantages are obtained more significantly. That is, the driver experiences the operational feeling that the driver himself or herself is operating the vehicle, i.e., the sense of unity with the vehicle.

When the engine output approaches the limit, the driver appropriately recognizes it, and can conduct operation such as a shift down at an appropriate timing.

Next, a second embodiment will be described.

Second Embodiment

Figure 8:
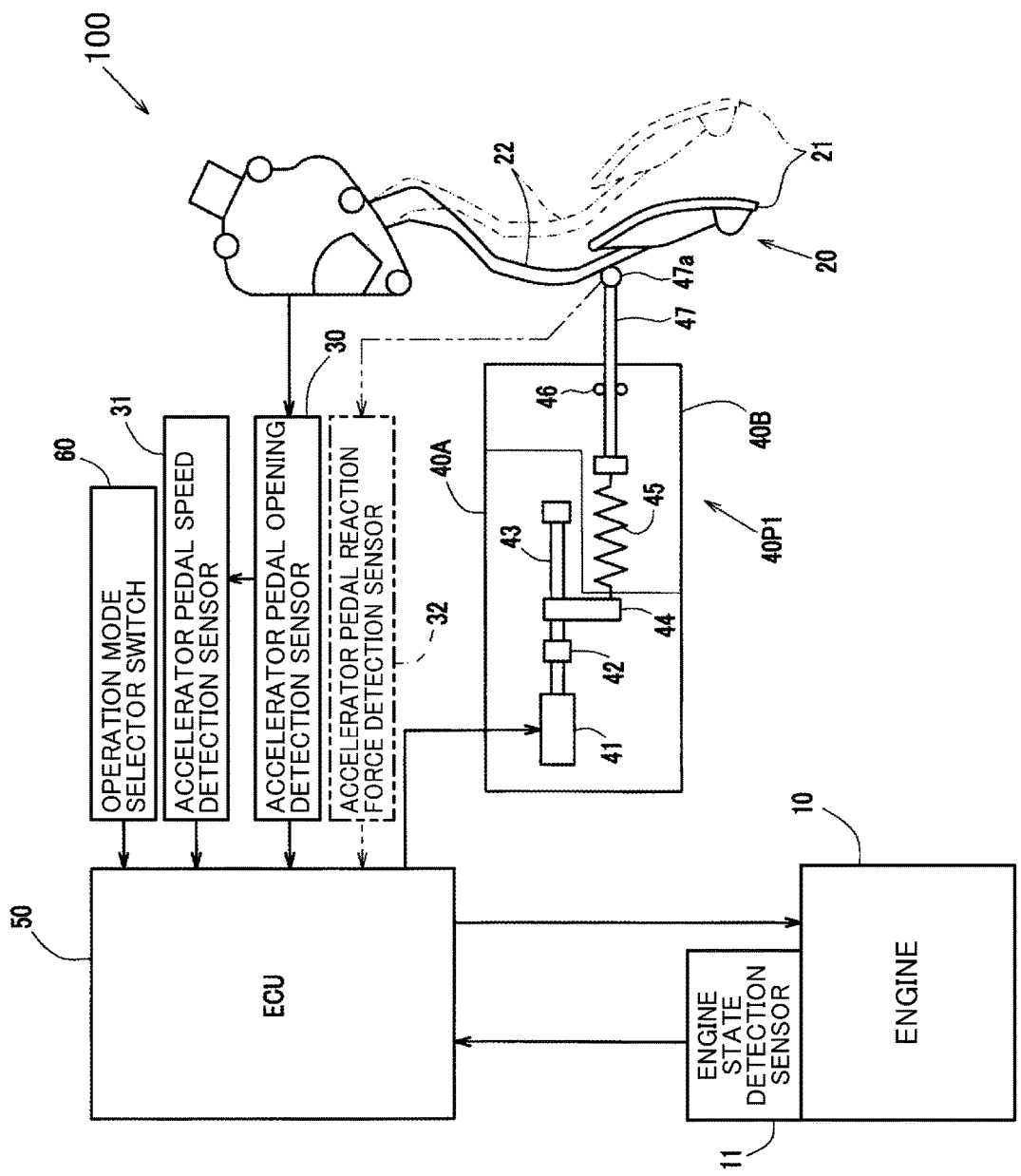
FIG. 8 is a block diagram showing a general configuration of a vehicle accelerator pedal reaction force control device of a second embodiment and a third embodiment.

Just like the vehicle accelerator pedal reaction force control device 1 of the first embodiment, a vehicle accelerator pedal reaction force control device 100 of the second embodiment includes an engine 10, an accelerator pedal 20, an accelerator pedal opening detection sensor 30 detecting a rotation angle of the accelerator pedal 20, a reaction force application unit 40P1 applying a reaction force (hereinafter referred to as a "pedal reaction force") to the accelerator pedal 20, an ECU 50 controlling the engine 10 and the reaction force application unit 40P1 based on the rotation angle detected by the accelerator pedal opening detection sensor 30, and an operation mode selector switch 60 switching the operation mode as shown in FIG. 8. In addition to these configurations, this vehicle accelerator pedal reaction force control device 100 further includes an accelerator pedal speed detection sensor 31 detecting a speed (an angular speed) of the accelerator pedal 20.

Based on the information about the rotation angle (the position information) of the accelerator pedal 20 detected by the accelerator pedal opening detection sensor 30, the accelerator pedal speed detection sensor 31 outputs the accelerator pedal speed information obtained by computing variation of the pedal position per unit time or differentiation of a pedal position with respect to time.

Figure 9:
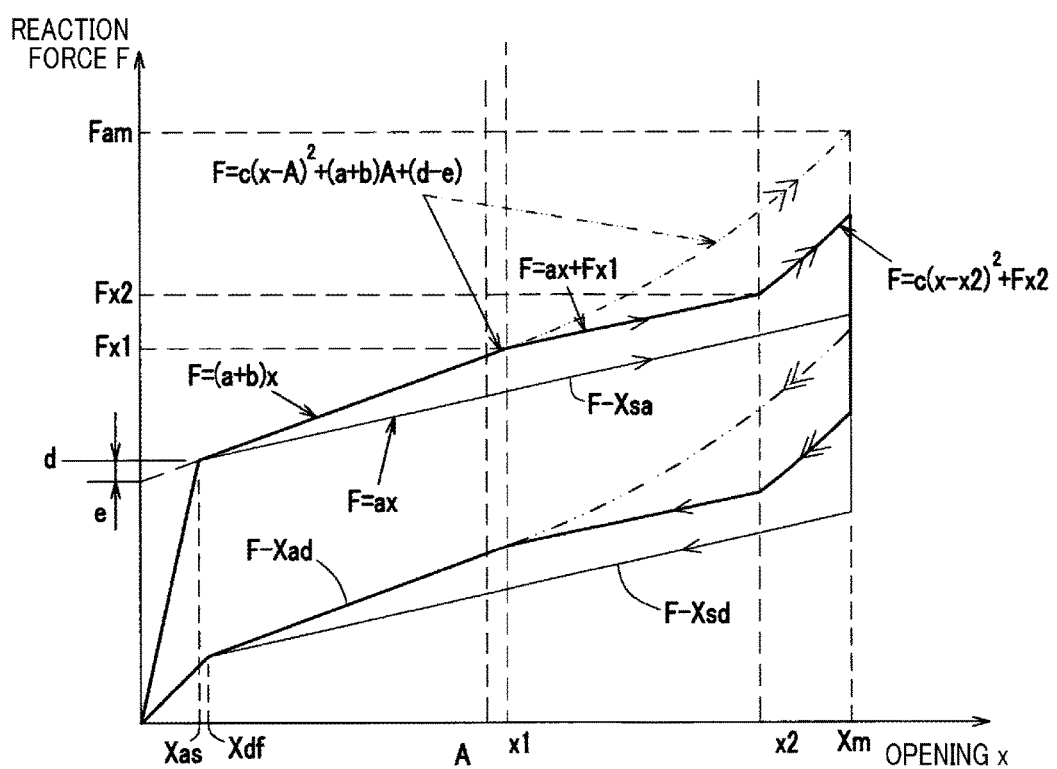
FIG. 9 is a graph showing an accelerator pedal reaction force characteristic.
Figure 10:
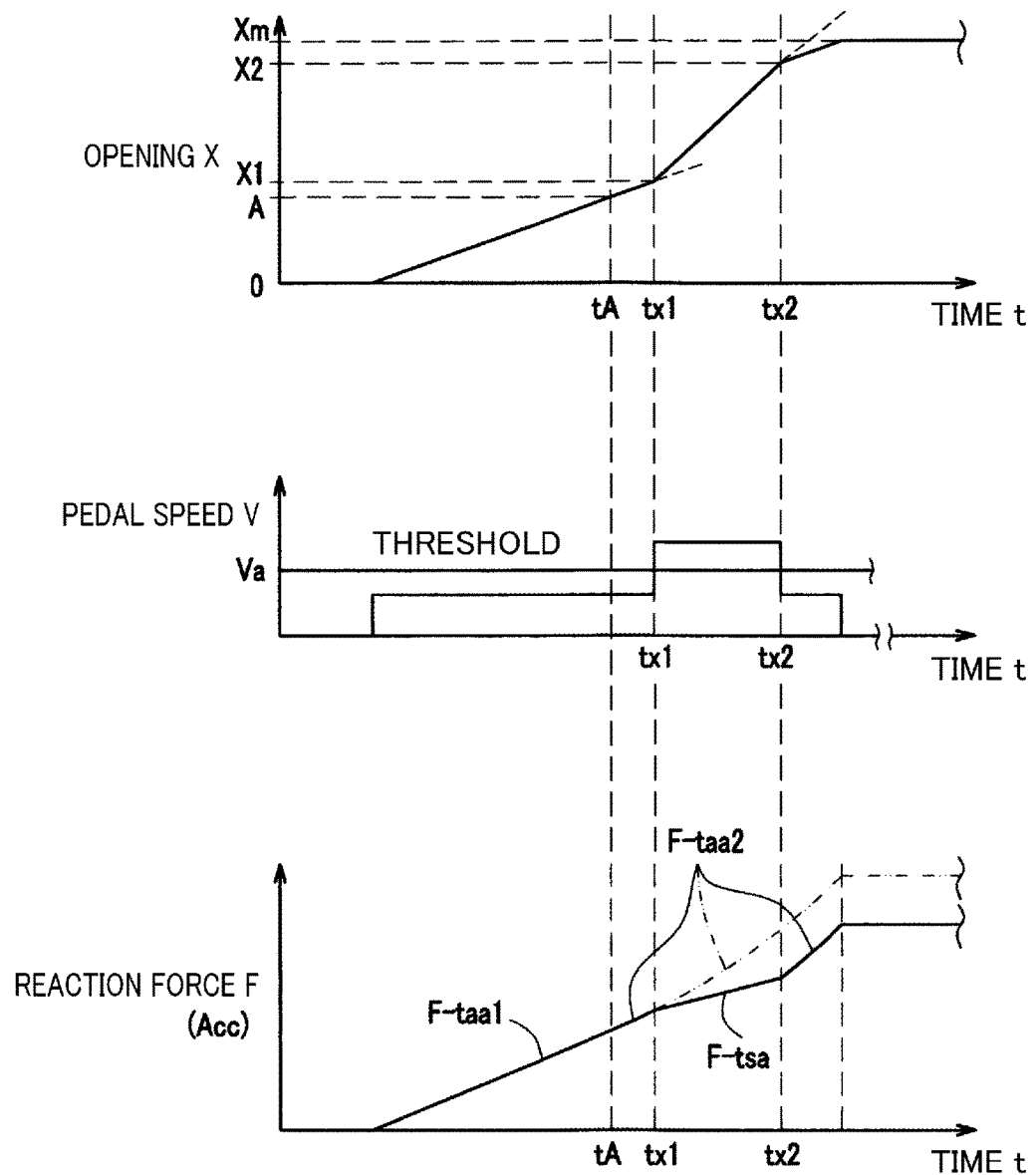
FIG. 10 shows timing charts of an opening, a pedal speed, and a reaction force of an accelerator pedal depression.

A third depressing pattern is different from the first depressing pattern, and is a depressing pattern where the accelerator pedal 20 is depressed to the pedal opening shown in timing charts shown in an upper graph of FIG. 10 and a center graph of FIG. 10. By taking this third depressing pattern as an example, a high-power mode depression reaction force characteristic of the second embodiment will be described with reference to FIG. 9, the upper, center, and lower graphs of FIG. 10. Note that, in the high-power mode depression reaction force characteristic of the second embodiment, the engine output characteristic has a relationship between the driving force and the accelerator opening indicated by the waveform T-Xa in the lower graph of FIG. 2, and thus the description thereof is omitted.

The depressing pattern of the accelerator pedal 20 is set so that, as shown in the upper and center graphs of FIG. 10, a predetermined speed threshold Va is set as a depressing speed of the accelerator pedal 20, and also as shown in the upper and center graphs of FIG. 10, the depressing speed of the accelerator pedal 20 is slower than the speed threshold Va when the accelerator opening is in the range from 0 to X1, the depressing speed of the accelerator pedal 20 is faster than the speed threshold Va when the accelerator opening is in the range from X1 to X2, and the depressing speed of the accelerator pedal 20 is slower than the speed threshold Va when the accelerator opening is in the range from X2 to the maximum accelerator opening Xm. Note that the accelerator opening X1 is larger than the opening threshold A.

The high-power mode depression reaction force characteristic of the second embodiment is the reaction force characteristic appearing in the high-power mode, and shows the reaction force characteristic of the high-power mode depression reaction force characteristic of the first embodiment because a depression is done at a depressing speed slower than the speed threshold Va until the pedal opening reaches the opening X1 (see FIG. 9).

In other words, the reaction force characteristic is represented by the first depression reaction force characteristic ($F=(a+b)x$) until the time (tA) when the pedal opening exceeds the opening threshold A (see FIG. 9 and the waveform F-taa1 in the lower graph of FIG. 10), and is represented by the second depression reaction force characteristic ($F=c(x-A)^2+(a+b)A+(d-e)$) after the pedal opening exceeds the opening threshold A (see FIG. 9 and the waveform F-taa2 in the lower graph of FIG. 10).

Then, as shown in the lower graph of FIG. 10, if the accelerator pedal speed detection sensor 31 detects the depressing speed beyond the speed threshold Va of the accelerator pedal 20, the reaction force characteristic is switched to the one in the standard mode at the time (tX1) of the pedal opening X1 based on a command of the ECU 50 (see the waveform F-tsa in the lower graph of FIG. 10), and the reaction force application unit 40P1 changes the biasing force of the return spring 45 so that the reaction force characteristic has a gentle inclination.

That is, the reaction force characteristic is switched from the second depression reaction force characteristic ($F=c(x-A)^2+(a+b)A+(d-e)$) to $F=ax+Fx1$ (see FIG. 9), where $Fx1=c(x1-A)^2+(a+b)A+(d-e)$.

Subsequently, if the depressing speed of the accelerator pedal 20 is slower than the speed threshold Va (tx2), the accelerator pedal speed detection sensor 31 detects such a depressing speed, and then, based on a command of the ECU 50, the reaction force characteristic similar to the one in the high-power mode is set again until the accelerator opening x2 at the time (tX2) when the depressing speed becomes slower than the speed threshold Va reaches the maximum accelerator opening Xm (see FIG. 9 and the waveform F-taa2 in the lower graph of FIG. 10). In this time, the reaction force characteristic is represented by $F=c(x-x2)^2+Fx2$, where $Fx2=a(x2-x1)+Fx1$.

Figure 11:
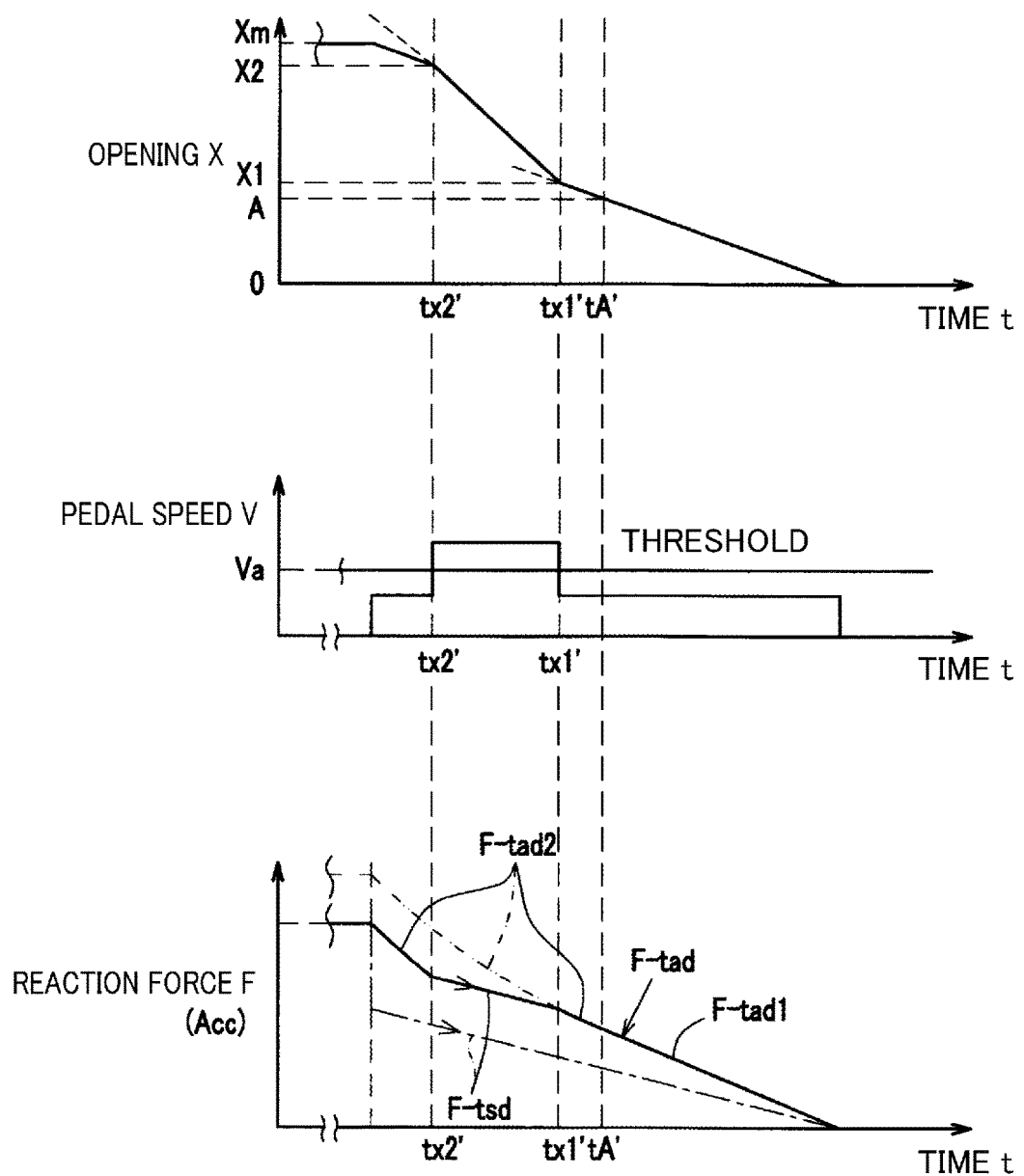
FIG. 11 shows timing charts of an opening, a pedal speed, and a reaction force of an accelerator pedal release.

On the other hand, the high-power mode release reaction force characteristic of the second embodiment has a characteristic such that, if a release is done such that a waveform of the third depressing pattern is traced from the maximum accelerator opening Xm to the release play opening Xdf (see FIG. 9) to be symmetric to the third depressing pattern with respect to the opening axis as shown by the third releasing pattern shown in the upper graph of FIG. 11, a waveform having a reaction force which is lower than, but has the same tendency as, the reaction force and tendency of the high-power mode depression reaction force characteristic of the second embodiment as shown in FIG. 9 is traced from the maximum accelerator opening Xm such that the opening becomes small (see the waveform F-Xsd in FIG. 9).

That is, as shown in the lower graph of FIG. 11, the high-power mode release reaction force characteristic of the second embodiment has a waveform symmetric to the high-power mode depression reaction force characteristic of the second embodiment with respect to the reaction force axis (see the waveform F-tsd in the lower graph of FIG. 11).

Specifically, by taking the third releasing pattern as an example where the accelerator pedal 20 is returned to the pedal opening as shown in the timing charts in the upper and center graphs of FIG. 11, the high-power mode release reaction force characteristic of the second embodiment will be described with reference to FIG. 9 and the upper, center and lower graphs of FIG. 11.

The release reaction force characteristic shows a release characteristic that is symmetric to the high-power mode depression reaction force characteristic of the first embodiment because the depressing speed is slower than the speed threshold Va until the opening reaches X2 (tx2') from the maximum accelerator opening Xm (see the center graph of FIG. 11) (see the waveform F-tad2 in FIG. 11).

If the opening becomes smaller than X2 and the releasing speed of the accelerator pedal 20 exceeds the speed threshold Va as shown in the upper and center graphs of FIG. 11, the accelerator pedal opening detection sensor 30 detects the depressing speed, and, based on a command of the ECU 50, the reaction force characteristic is switched to the one in the standard mode at the time of opening X2 (see FIG. 9 and the waveform F-tsd in the lower graph of FIG. 11). That is, the slope of the reaction force with respect to the opening is indicated by the parameter a, which is a gentle inclination.

Then, if the opening reaches X1, and the depressing speed of the accelerator pedal 20 is slower than the speed threshold Va (tx1'), the accelerator pedal opening detection sensor 30 detects the depressing speed, and, based on a command of the ECU 50, the operating mode is switched to the high-power mode again until the opening X1 reachs 0. During this time, the reaction force characteristic has the waveform F-tad2 shown in the lower graph of FIG. 11 until the time (tA') when the pedal opening is more than or equal to the opening threshold A, and then has the waveform F-tad1 shown in the lower graph of FIG. 11 until the time when the pedal opening is returned below the opening threshold A.

Note that the high-power mode release reaction force characteristic of the second embodiment is not limited to the release reaction force characteristic, and may be set to have the same inclination as that of the standard mode release reaction force characteristic (see, for example, the waveform F-Xsd in FIG. 9 and the waveform F-tsd in the lower graph of FIG. 11).

Next, one embodiment of the reaction force control of the accelerator pedal 20 using the accelerator pedal reaction force control device 100 having the high-power mode depression reaction force characteristic of the second embodiment will be described by using a flowchart of FIG. 12.

Figure 12:
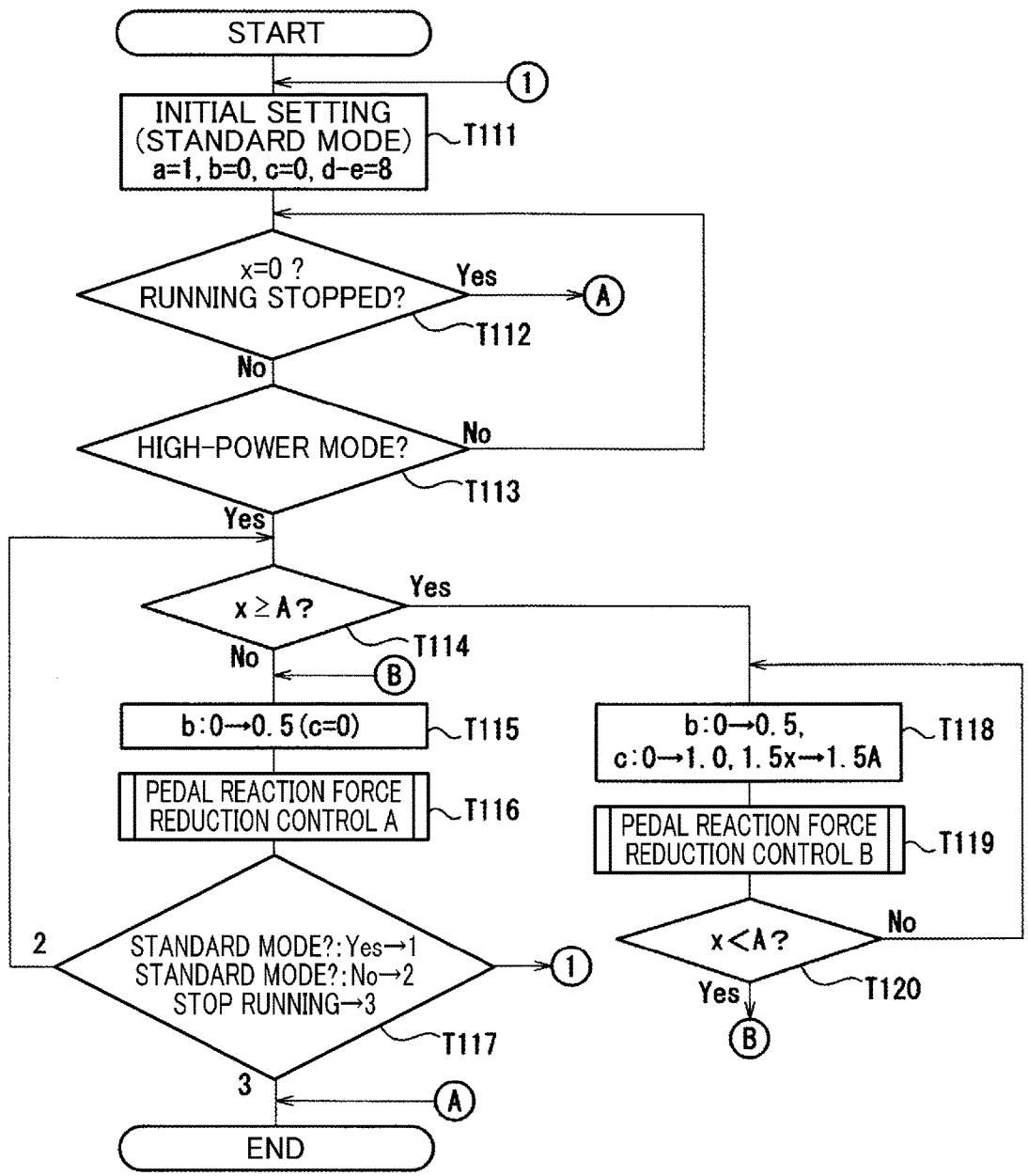
FIG. 12 is a flowchart showing one example of vehicle accelerator pedal reaction force control.

Note that Steps T111-T113, T117, and T120 in the flowchart of FIG. 12 correspond to Steps S111-S113, S116, and S118 in the flowchart of FIG. 5, respectively. The same processing as that in the reaction force control of the accelerator pedal 20 described by using FIG. 5 will be omitted if unnecessary.

The process conducted after the determination of the high-power mode is done in Step T113 (the answer is Yes in Step T113) will be first described. The determining process for determining whether the opening is larger than the opening threshold A or not is conducted (Step T114).

If it is determined in this determining process that the opening is smaller than the opening threshold A (if the answer is No in Step T114), the value of the parameter b is switched from 0 to 0.5 (Step T115) so that the high-power mode where the opening is smaller than the opening threshold A is selected. In other words, the reaction force characteristic is set to the first depression reaction force characteristic (the waveform F-Xaa1).

Then, a subroutine of a pedal reaction force reduction control A is executed (Step T116).

Figure 13A:
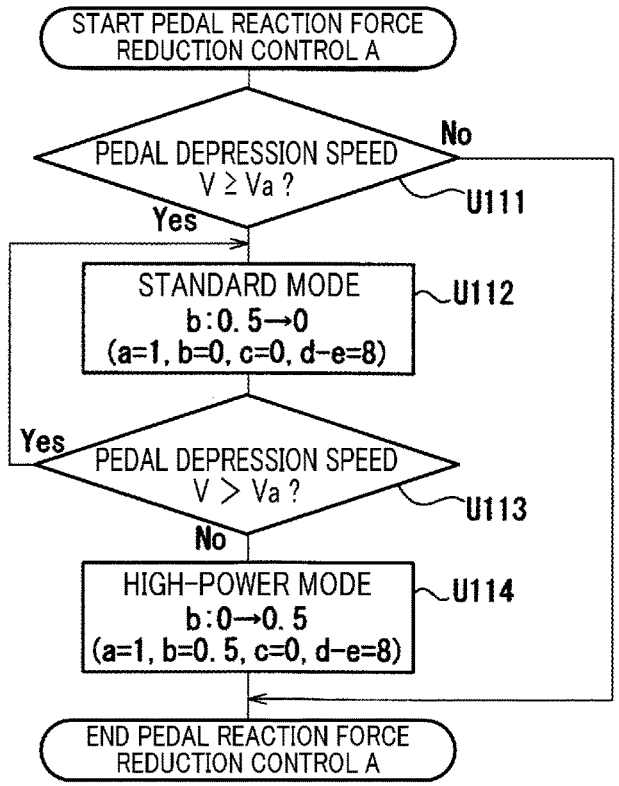
FIG. 13A is a flowchart showing a pedal reaction force reduction control A.

As shown in FIG. 13A, in this subroutine of the pedal reaction force reduction control A, it is determined whether the pedal depression speed is more than or equal to speed threshold Va (Step U111). If the pedal depression speed is more than or equal to the speed threshold Va (if the answer is Yes in Step U111), the value of the parameter b is switched from 0.5 to 0 and the reaction force characteristic is set to F=ax+Fx1 as shown in FIG. 9 (Step U112), where Fx1=c (x1−A)$^2$+(a+b)A+(d−e). In other words, the reaction force characteristic is set to a linear characteristic having the same inclination as that in the standard mode (see the waveform F-tsa in the lower graph of FIG. 10).

Specifically, based on a command of the ECU 50, the reaction force application unit 40P1 makes the slider 44 slide by the driving force of the motor 41, and makes the pressing pin 47 press the accelerator pedal 20 while changing the biasing force of the return spring 45 so that the reaction force/opening characteristic expression holds.

If the pedal depression speed is lower than the speed threshold Va (if the answer is No in Step U113), the processing for switching the value of the parameter b from 0 to 0.5 is executed (Step U114). In other words, the process for returning the reaction force characteristic from the same reaction force characteristic as that in the standard mode setting to the first depression reaction force characteristic is executed.

After Step U114 is conducted, or if it is determined in the determining process of Step U111 that the pedal depression speed is lower than the speed threshold Va (if the answer is No in Step U111), the subroutine of the pedal reaction force reduction control A is ended.

On the other hand, if it is determined in the determining process of Step T114 shown in FIG. 12 that the opening is more than or equal to the opening threshold A (if the answer is Yes in Step T114), the value of the parameter b is switched from 0 to 0.5, the value of the parameter c is switched from 0 to 1.0, and further the term 1.5x in the reaction force/opening principle characteristic expression (F=(x−A)$^2$+ 1.5x+8) is switched to 1.5 A (Step T118), so that the reaction force characteristic is set to the same as the second depression reaction force characteristic where the opening is more than or equal to the opening threshold A. In other words, the reaction force characteristic is set to the second depression reaction force characteristic (the waveform F-Xaa2).

Then, a subroutine of a pedal reaction force reduction control B is executed (Step T119).

Figure 13B:
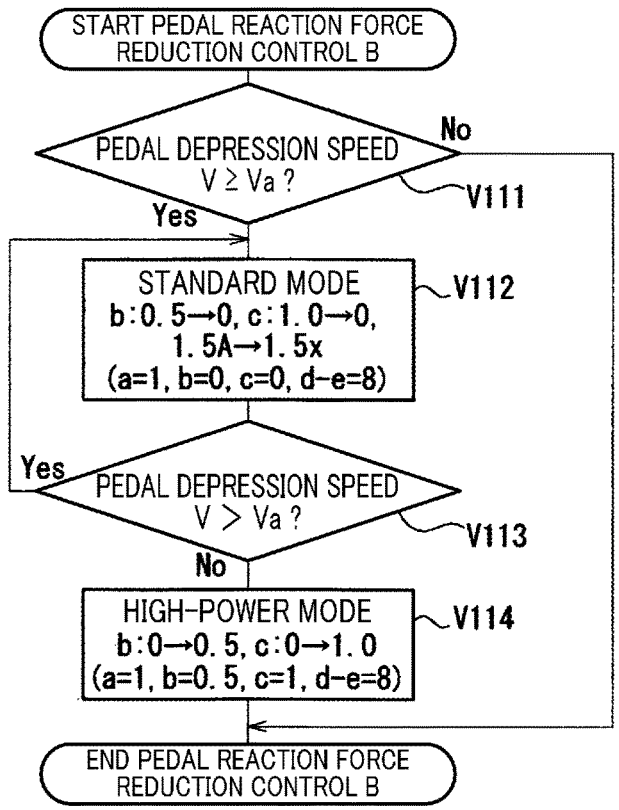
FIG. 13B is a flowchart showing a pedal reaction force reduction control B.

As shown in FIG. 13B, in this subroutine of the pedal reaction force reduction control B, particularly in Step V112, the reaction force characteristic is changed from the second depression reaction force characteristic setting to the same reaction force characteristic setting as that in the standard mode, and in Step V114, the reaction force characteristic is returned from the standard mode reaction force characteristic to the second depression reaction force characteristic setting. Except these configurations, the subroutine of the pedal reaction force reduction control B is basically the same as the subroutine of the pedal reaction force reduction control A, and thus the description thereof is omitted.

Next, a high-power mode depression reaction force characteristic of a third embodiment and a high-power mode release reaction force characteristic of the third embodiment will be described.

Third Embodiment

Just like the vehicle accelerator pedal reaction force control device of the second embodiment, a vehicle accelerator pedal reaction force control device 100 of the third embodiment includes an engine 10, an accelerator pedal 20, an accelerator pedal opening detection sensor 30, a reaction force application unit 40P1, an ECU 50, an operation mode selector switch 60, and an accelerator pedal speed detection sensor 31 (see FIG. 8).

The high-power mode depression reaction force characteristic (the waveform F-Xaa) is not limited to the reaction force characteristic indicated by the waveform comprised of the first depression reaction force characteristic (the waveform F-Xaa1) and the second depression reaction force characteristic (the waveform F-Xaa2) as long as the reaction force increases with an increase in the accelerator opening. For example, like the high-power mode depression reaction force characteristic of the third embodiment, the reaction force characteristic may be comprised of only the first depression reaction force characteristic.

In other words, the relation between the pedal reaction force F and the accelerator opening x where the accelerator opening is in the range from the depression play opening Xas to the maximum accelerator opening Xm may have a linear waveform having an inclination (a+b) steeper than an inclination (a) of the standard mode reaction force characteristic showing the linear reaction force characteristic.

Figure 14:
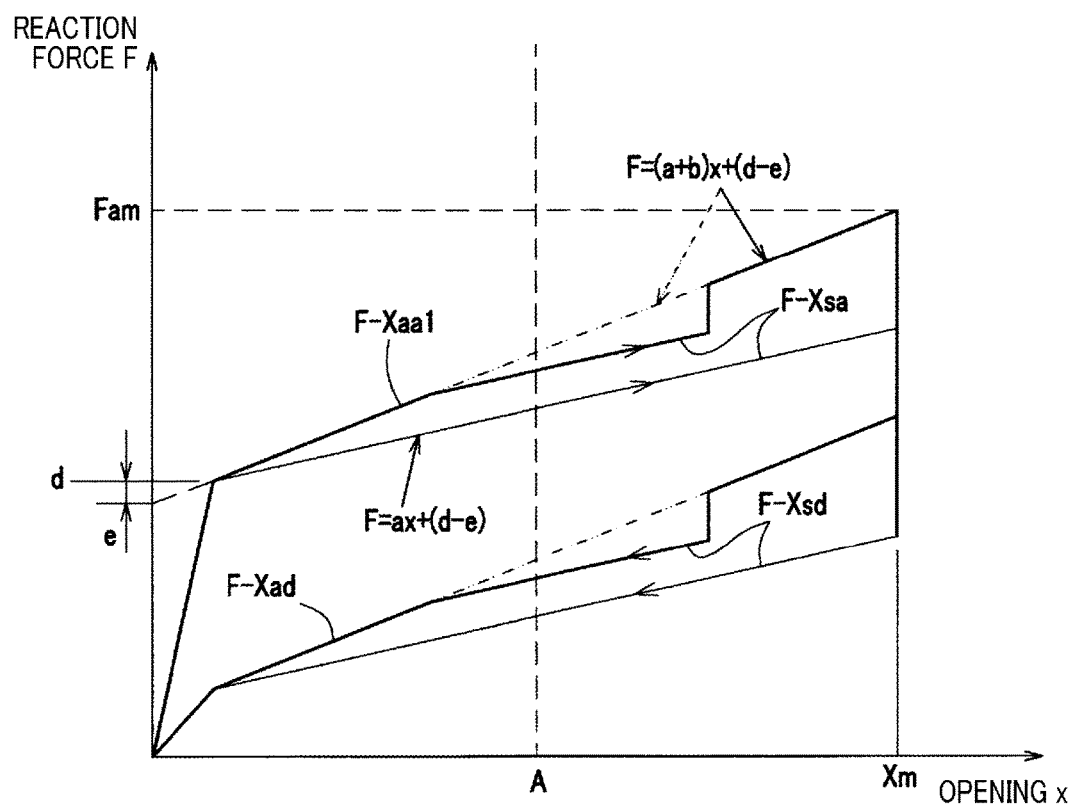
FIG. 14 is a graph showing an accelerator pedal reaction force characteristic.
Figure 15:
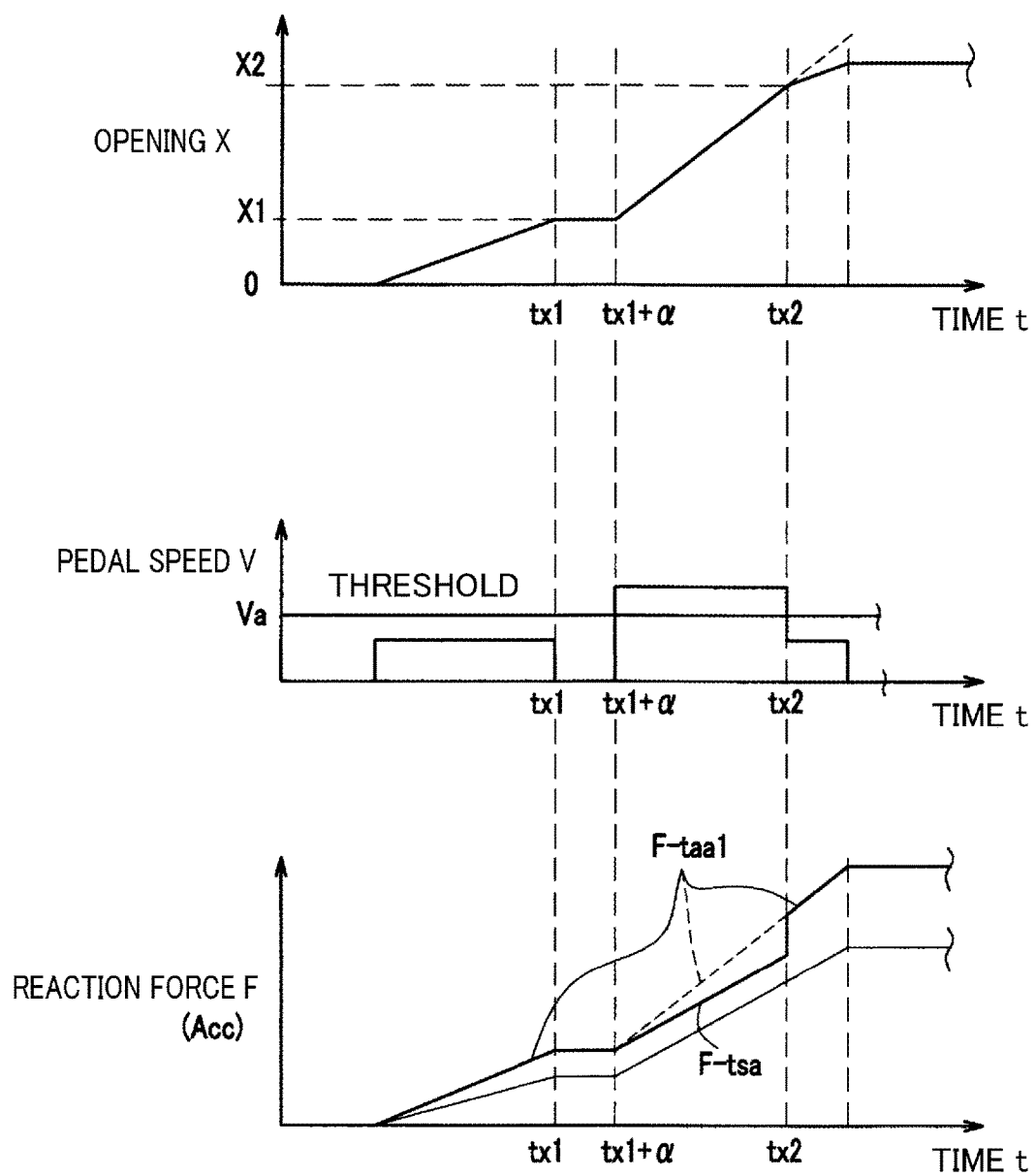
FIG. 15 shows timing charts of an opening, a pedal speed, and a reaction force of an accelerator pedal depression.

As one embodiment where the pedal reaction force reduction control is done to the vehicle accelerator pedal reaction force control device 100 showing the high-power mode depression reaction force characteristic of the third embodiment, for example, an example of the fourth depressing pattern which is different from the depressing pattern and in which the accelerator pedal 20 is depressed to the pedal opening shown by the timing charts in an upper graph of FIG. 15 and a center graph of FIG. 15 will be described with reference to FIG. 14 and a lower graph of FIG. 15.

Note that the upper and center graphs of FIG. 15 are the timing charts showing the opening changes where, after being depressed from the opening 0 at a depressing speed slower than the speed threshold Va, the accelerator pedal 20 maintains a constant opening X1 for a predetermined time (a), and then is depressed at a depressing speed faster than the speed threshold Va until the opening reaches X2.

After maintaining the accelerator opening at a constant opening X1, such an accelerator pedal 20 is depressed at a depressing speed faster than the speed threshold Va, and thus, during this time, the reaction force characteristic is set to the standard mode as described above by the pedal reaction force reduction control (see the waveform F-Xsa in FIG. 14 and the waveform F-tsa in the lower graph of FIG. 15). Then, a depression is done at a depressing speed slower than the speed threshold Va from the time (tx2) when the accelerator opening reaches X2, and thus the high-power mode is set until the accelerator opening reaches the maximum accelerator opening Xm.

Note that the reaction force characteristic may be set so that the reaction force may continuously increase with an increase in the accelerator opening at the time when the accelerator opening reaches X2, against the value of the reaction force where the accelerator opening reaches x2 under the standard mode setting. However, as shown in the lower graph of FIG. 11, the reaction force increases in a stepwise manner, and the reaction force characteristic is set to have a rising waveform at the accelerator opening x2.

Specifically, the reaction force at the accelerator opening X2 increases in a stepwise manner to the value of the reaction force appearing when the accelerator opening reaches from X1 to X2 where the high-power mode setting remains.

Figure 16:
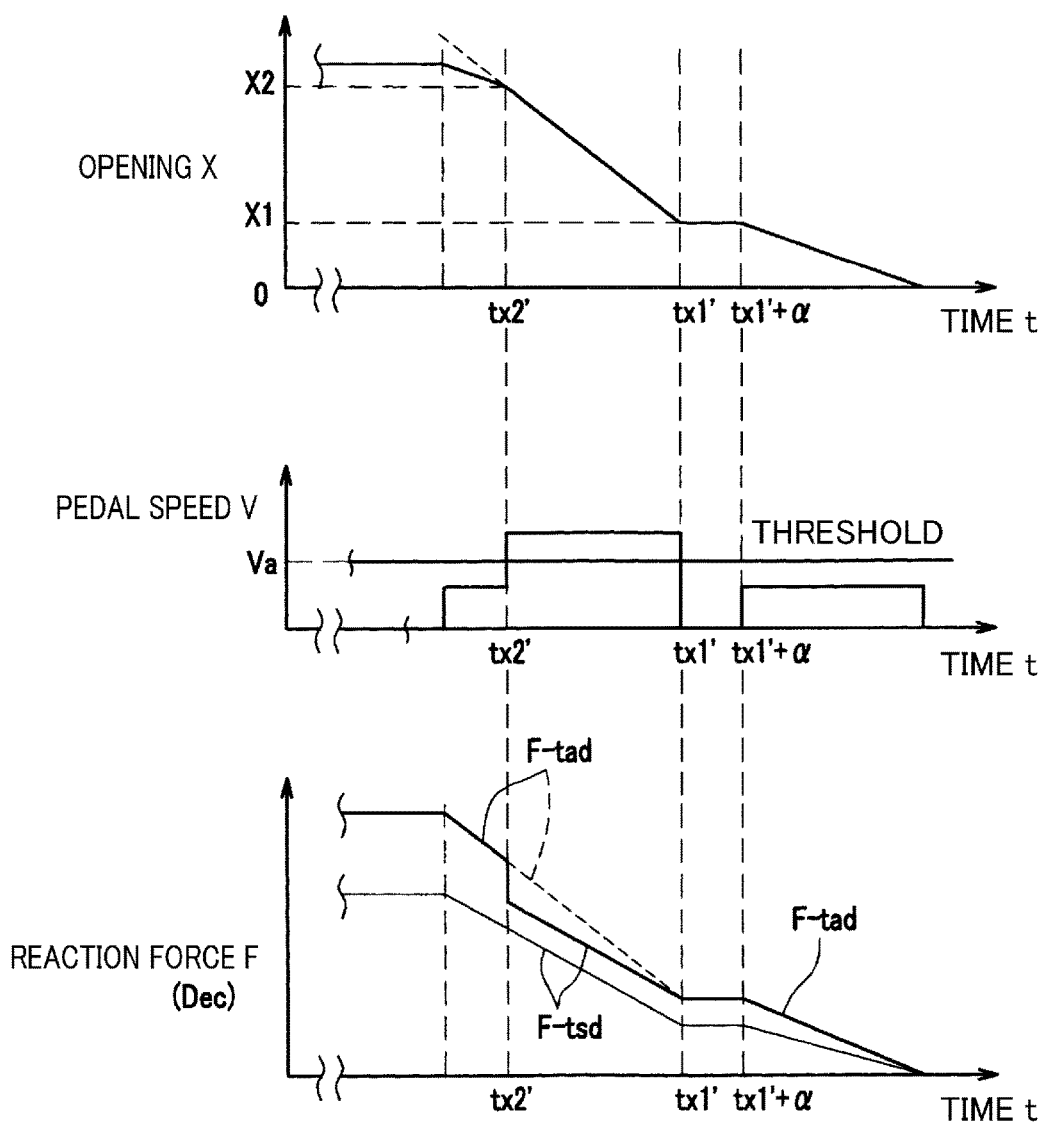
FIG. 16 shows timing chart of an opening, a pedal speed, and a reaction force of an accelerator pedal release.

On the other hand, the high-power mode release reaction force characteristic of the third embodiment has such a characteristic that, if a release is done as shown by a fourth releasing pattern shown in an upper graph of FIG. 16 so that the waveform is symmetric to the fourth depressing pattern with respect to the opening axis so that the waveform of the fourth depressing pattern is traced from the maximum accelerator opening Xm to the release play opening Xdf (see FIG. 14), the waveform that is lower than but has the same tendency as the reaction force of the high-power mode depression reaction force characteristic of the third embodiment is traced from the maximum accelerator opening Xm to the smaller opening as shown in FIG. 14 (see the waveform F-Xsd in FIG. 14).

In other words, as shown in a lower graph of FIG. 16, the high-power mode release reaction force characteristic of the third embodiment has a waveform symmetric to the high-power mode depression reaction force characteristic of the third embodiment with respect to the reaction force axis (see the waveform F-tsd in the lower graph of FIG. 16).

Note that the high-power mode release reaction force characteristic of the third embodiment is not limited to the release reaction force characteristic, and may be set to the characteristic having the same inclination as that of the standard mode release reaction force characteristic (see, for example, the waveform F-Xsd in FIG. 14 and the waveform F-tsd in the lower graph of FIG. 16).

In this manner, the vehicle accelerator pedal reaction force control device 100 of the second and third embodiments is an accelerator pedal reaction force control device of an automobile including the accelerator pedal opening detection sensor 30 as an accelerator opening detection system for detecting the accelerator opening of the accelerator pedal 20, and the ECU 50 as a vehicle running control system for controlling the driving force based on the accelerator opening, where the pedal reaction force is controlled. The vehicle accelerator pedal reaction force control device 100 is provided with the accelerator pedal speed detection sensor 31 as a pedal operation variation detection system (a pedal operation speed detection system) for detecting the depressing speed and releasing speed as operation variation varying depending on the operation of the accelerator pedal 20, and the ECU 50 as a pedal reaction force reduction system for reducing an increase in the pedal reaction force if the high-power mode as a second mode that more raises the pedal reaction force than the standard mode as a first mode does is selected and when the accelerator pedal speed detection sensor 31 detects the depressing speed or releasing speed that is more than or equal to the predetermined speed threshold Va.

According to the above-described configuration, the vehicle accelerator pedal reaction force control device 100 may provide the driver with the sense of security with increased resistance at the time of depressing the accelerator pedal 20, stability, and light and smooth operational feeling during rapid acceleration operation, i.e., the sense of unity with the vehicle.

Here, when controlling the driving force, the vehicle running control system controls the engine output not only directly, but also indirectly by controlling shifting, braking, etc. Specifically, the vehicle running control system includes the traction control in which idling is detected from the vehicle speed and the rotating speed of each tire, for example, and the driving force from the engine 10 is reduced and adjusted to resolve the idling of the tire.

In addition, the vehicle accelerator pedal reaction force control device 100 of one embodiment of this invention is characterized in that the high-power mode has a characteristic where the reaction force increase amount increases with respect to the standard mode with an increase in the accelerator opening, and if the operation speed, i.e., the depressing speed and releasing speed, are faster than or equal to the predetermined speed threshold Va, the increase in the reaction force increase amount with respect to the accelerator opening increase amount is reduced.

According to the above configuration, the reaction force of the accelerator pedal 20 is prevented from increasing at an increasing rate, and the accelerator pedal 20 can be deeply depressed without causing stress on the driver.

In addition, the vehicle accelerator pedal reaction force control device 100 of one embodiment of this invention is set to have a characteristic so that the driving force with respect to the accelerator opening in the high-power mode is set to be higher than that in the standard mode, and the ECU 50 as a pedal reaction force reduction system reduces an increase in the pedal reaction force with an increase in the accelerator opening so that the pedal reaction force is in the range where the pedal reaction force is more than or equal to the pedal reaction force in the standard mode, in particular has the same characteristic as that in the standard mode.

According to the above configuration, the driver is able to feel a heavy pedal effort than in the first mode such as the standard mode when he or she depresses the accelerator pedal 20 deeper, and thus the pedal operation is performed smoothly with an appropriate reaction force.

Regarding the correspondence between the configuration of this invention and the first to third embodiments, the accelerator opening detection system of this invention corresponds to the accelerator pedal opening detection sensor 30. Similarly, the pedal operation variation detection system corresponds to the accelerator pedal speed detection sensor 31, the vehicle running control system and the pedal reaction force reduction system correspond to the ECU 50, the first mode corresponds to the standard mode, the second mode corresponds to the high-power mode, the operation variation corresponds to the depressing speed and releasing speed, and the predetermined value corresponds to the opening threshold A in the first embodiment, while corresponding to the speed threshold Va in the second to third embodiments. However, this invention is not limited to the configurations of the first to third embodiments.

Other Embodiments

Specifically, instead of the accelerator pedal speed detection sensor 31 or in addition to the accelerator pedal speed detection sensor 31, the vehicle accelerator pedal reaction force control device 100 may include an accelerator pedal reaction force detection sensor 32 shown by a block of a two-dot chain line in FIG. 8. In this case, the pedal reaction force, the control force, and the pedal reaction force may be detected so that the accelerator pedal reaction force control is conducted based on this pedal reaction force. In addition, although not shown in the figures, the an accelerator pedal acceleration detection sensor for detecting an acceleration (an angular acceleration) of the accelerator pedal 20 may be provided so that the accelerator pedal acceleration control is conducted based on this acceleration.

In addition, the high-power mode depression reaction force characteristic is not limited to the above-described characteristics as long as the increase rate of such a characteristic increases depending on the accelerator opening.

Specifically, the second depression reaction force characteristic is not limited to the characteristic having the above-described waveform, and may be a characteristic that has a plurality of consecutive quadratic waveforms each having a different rising degree that gradually increases depending on the time. In addition, the second depression reaction force characteristic is not limited to the above-described quadratic characteristic, and may be a characteristic that has a plurality of consecutive linear waveforms arranged in a stepwise manner and each having a different inclination that gradually increases depending on the time.

In addition, the second depression reaction force characteristic is not limited to the above-described characteristic, as long as the waveform is a combination of a quadratic waveform and a linear waveform so that the increase rate increases depending on the time.

Similarly, the first depression reaction force characteristic is also not limited to the above-described characteristic having the linear waveform, as long as the waveform is a quadratic waveform or a combination of a plurality of waveforms so that the increase rate increases depending on the time.

In other words, the high-power mode depression reaction force characteristic is not limited to the depression reaction force characteristic having two types of the waveforms which are the first depression reaction force characteristic and the second depression reaction force characteristic, and may be a depression reaction force characteristic having one type or three or more types of the waveforms as long as the increase rate increases depending on the time.

In addition, as described above, the operation mode is not limited to be switched by using the operation mode selector switch 60, and may be switched by another way, e.g., a shift lever operation.

In addition, the high-power mode depression reaction force characteristic and the high-power mode release reaction force characteristic of the second embodiment and the third embodiment are set so that the increase in the pedal reaction force with an increase in the accelerator opening is reduced so that the pedal reaction force has the same characteristic as that in the standard mode (FIG. 9 and FIG. 14), but, alternatively, may have a characteristic where the increase is reduced in the range where the pedal reaction force is more than or equal to that in the standard mode.

Figure 17A:
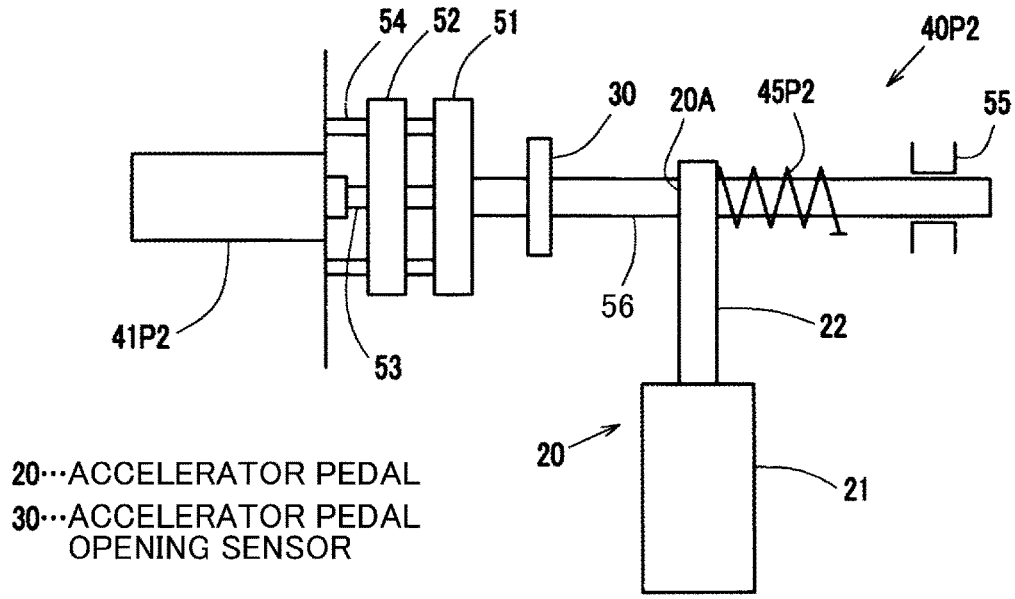
FIG. 17A is a schematic view of a reaction force application unit of another embodiment.
Figure 17B:
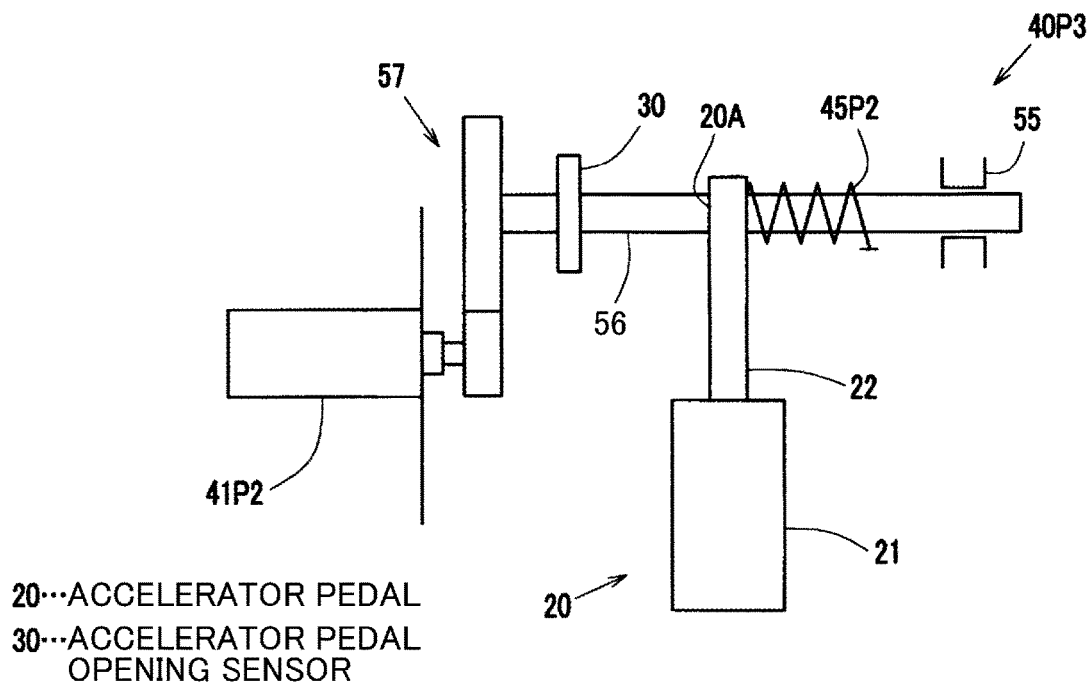
FIG. 17B is a schematic view of a reaction force application unit of still another embodiment.

Furthermore, as described above, the reaction force application unit 40P1 does not always include the spring-type reaction force characteristic change portion 40A that changes the reaction force characteristic by changing the biasing force of the return spring 45, and may have, for example, configurations shown in FIGS. 17A and 17B.

As shown in FIG. 17A, a reaction force application unit 40P2 includes a holding shaft 56 to which a base end portion 20A of the accelerator pedal 20 is fixed and which is rotatable with respect to a vehicle body, a return spring 45P2 coupled to the holding shaft 56 and the vehicle body and biased so that the accelerator opening is 0, a first friction member 51 fixed to one end of the holding shaft 56, a second friction member 52 located opposite to the holding shaft 56 with respect to the first friction member 51, an actuator 41P2 making the second friction member 52 pressed onto the first friction member 51 or making the second friction member 52 separably slide with respect to the first friction member 51, and a screw shaft 53 guiding the slide of the second friction member 52.

Note that, in FIG. 17A, a reference numeral 54 denotes a guide shaft, a reference numeral 55 denotes a bearing, and a reference numeral 30 denotes an accelerator pedal opening detection sensor.

As illustrated in FIG. 17A, the reaction force application unit 40P1 may include a so-called friction-type reaction force characteristic change portion for changing the reaction force characteristic by changing the friction forces depending on the degree of the driving force of the actuator 41P2 for pressing the second friction member 52 onto the first friction member 51.

Moreover, as illustrated in FIG. 17B, a reaction force application unit 40P3 of another embodiment may include a speed reducer 57 between the motor 41P2 as an actuator and one end of the holding shaft 56 without providing the first and second friction members 51 and 52, and the guide shaft 54 of the above-described reaction force application unit 40P2, so that the driving force of the motor 41P2 is transferred to the holding shaft 56 through the speed reducer 57, and the reaction force (a regenerative force and a repulsion force) against the pedal effort of the accelerator pedal 20 is generated directly by the motor 41P2.

INDUSTRIAL APPLICABILITY

As described above, the present invention is useful for a vehicle accelerator pedal reaction force control device 1, 100 controlling a reaction force of an accelerator pedal in an automobile, for example, the vehicle accelerator pedal reaction force control device 1, 100 including an accelerator opening detection system detecting an accelerator opening of the accelerator pedal and a vehicle running control system controlling a driving force based on the accelerator opening, wherein the vehicle accelerator pedal reaction force control device has a first mode in which a relation of the driving force with respect to the accelerator opening is regarded as a predetermined characteristic and a second mode where the driving force is higher than that in the first mode, and in the second mode, the accelerator pedal reaction force increases with an increase in the accelerator opening with respect to the first mode.

In addition, one embodiment of the present invention is useful for a vehicle accelerator pedal reaction force control device 100 controlling a pedal reaction force in an automobile, for example, the vehicle accelerator pedal reaction force control device 100 including an accelerator opening detection system detecting an accelerator opening of an accelerator pedal and a vehicle running control system controlling the driving force based on the accelerator opening, wherein the vehicle accelerator pedal reaction force control device 100 includes a pedal operation variation detection system detecting an operation variation varied by operation of the accelerator pedal, and a pedal reaction force reduction system reducing an increase in the pedal reaction force if the second mode where the pedal reaction force increases with respect to the pedal reaction force in the first mode is set and the pedal operation variation detection system detects the operation variation that is more than or equal to a predetermined operation variation.

DESCRIPTION OF REFERENCE CHARACTERS 1, 100 Vehicle Accelerator Pedal Reaction Force Control Device
20 Accelerator Pedal
30 Accelerator Pedal Opening Detection Sensor (Accelerator Opening Detection System)
31 Accelerator Pedal Speed Detection Sensor (Pedal Operation Variation Detection System)
50 ECU (Vehicle Driving Control System and Pedal Reaction Force Reduction System)
A Opening Threshold (Predetermined Value)
Va Speed Threshold (Predetermined Value)

The invention claimed is:

1. A vehicle accelerator pedal reaction force control device controlling a pedal reaction force in an automobile, the vehicle accelerator pedal reaction force control device including
an accelerator opening detection system detecting an accelerator opening of an accelerator pedal,
a vehicle running control system controlling a driving force based on the accelerator opening,
a pedal operation variation detection system detecting an operation variation varied by operation of the accelerator pedal, and
a pedal reaction force reduction system reducing an increase in the pedal reaction force if the second mode where the pedal reaction force increases with respect to the pedal reaction force in the first mode is set and the pedal operation variation detection system detects the operation variation that is more than or equal to a predetermined operation variation, wherein
the pedal operation variation detection system is a pedal operation speed detection system detecting an operation speed as an operation variation,
the vehicle accelerator pedal reaction force control device has a first mode in which a relation of the driving force with respect to the accelerator opening is regarded as a predetermined characteristic and a second mode in which the driving force is higher than the driving force in the first mode,
in the second mode, the pedal reaction force increases with an increase in the accelerator opening with respect to the first mode, and
the second mode has a characteristic where a rate of increase of the pedal reaction force increases with an increase in the accelerator opening with respect to the first mode, and if the operation speed is a predetermined value or higher, an increase in the rate of increase of the pedal reaction force with respect to an accelerator opening increase amount is reduced.

2. The vehicle accelerator pedal reaction force control device of claim 1, wherein
a release side of the accelerator opening in the second mode is set to the same reaction force as that in the first mode.

3. The vehicle accelerator pedal reaction force control device of claim 2, wherein
the second mode is a high-power mode where the driving force with respect to the accelerator opening is set to be higher than the driving force in the first mode, and
in the second mode, the pedal reaction force reduction system reduces an increase in the pedal reaction force with an increase in the accelerator opening in a range where the pedal reaction force is larger than the pedal reaction force in the first mode.

4. The vehicle accelerator pedal reaction force control device of claim 1, wherein
the second mode is a high-power mode where the driving force with respect to the accelerator opening is set to be higher than the driving force in the first mode, and
in the second mode, the pedal reaction force reduction system reduces an increase in the pedal reaction force with an increase in the accelerator opening in a range where the pedal reaction force is larger than the pedal reaction force in the first mode.

* * * * *